(12) United States Patent
Murade

(10) Patent No.: US 7,298,356 B2
(45) Date of Patent: Nov. 20, 2007

(54) ELECTRO-OPTIC DEVICE AND ELECTRONIC EQUIPMENT

(75) Inventor: Masao Murade, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 689 days.

(21) Appl. No.: 10/826,362

(22) Filed: Apr. 19, 2004

(65) Prior Publication Data

US 2004/0245551 A1 Dec. 9, 2004

(30) Foreign Application Priority Data

| May 2, 2003 | (JP) | ............................. 2003-127309 |
| Feb. 27, 2004 | (JP) | ............................. 2004-054200 |

(51) Int. Cl.
G09G 3/36 (2006.01)

(52) U.S. Cl. ....................................... 345/92

(58) Field of Classification Search .................. 345/87, 345/98, 92; 257/222, 59, 72; 349/39, 151; 438/149
See application file for complete search history.

(56) References Cited

U.S. PATENT DOCUMENTS

| 6,404,414 B2 * | 6/2002 | Ishii ............................. 345/90 |
| 6,552,758 B1 * | 4/2003 | Koyama ....................... 349/43 |
| 6,791,523 B2 * | 9/2004 | Fujita et al. .................. 345/92 |
| 2002/0186192 A1 * | 12/2002 | Maruoka et al. .............. 345/87 |
| 2003/0076459 A1 | 4/2003 | Murade |

FOREIGN PATENT DOCUMENTS

| CN | 1410805 A | 4/2003 |
| JP | A-09-230362 | 9/1997 |
| JP | A 11-223832 | 8/1999 |
| JP | A-11-266079 | 9/1999 |
| JP | A-2001-142088 | 5/2001 |
| JP | A-2001-249625 | 9/2001 |
| JP | A-2001-305580 | 10/2001 |
| JP | A-2002-156653 | 5/2002 |
| JP | A-2002-350885 | 12/2002 |
| TW | 503337 | 9/2002 |

* cited by examiner

Primary Examiner—Richard Hjerpe
Assistant Examiner—Abbas Abdulselam
(74) Attorney, Agent, or Firm—Oliff & Berridge, PLC

(57) ABSTRACT

The invention provides an electro-optic device that includes a frame (i.e., frame-shaped pattern) disposed on a frame area in a TFT array substrate. The frame area is disposed between an image display area and a peripheral area. The frame is formed of the same film as capacitor electrodes, and is disposed at least a part of the frame area. The frame is formed of the same film as wiring connected to an external circuit-connecting terminal. Accordingly, the electro-optic device can prevent the generation of an image caused by light leakage at the periphery of the image as much as possible, and thereby improve image quality.

19 Claims, 14 Drawing Sheets

ELECTRO-OPTIC DEVICE AND ELECTRONIC EQUIPMENT

BACKGROUND OF THE INVENTION

1. Field of Invention

The invention relates to the technical field of electro-optic devices, such as active matrix-type liquid crystal devices, electrophoresis devices, e.g., electronic paper, and electroluminescent display devices. The invention also relates to the technical field of electronic equipment including, such electro-optic devices.

2. Description of Related Art

An electro-optic device driven by an active matrix can include a substrate having pixel electrodes arranged in a matrix, thin film transistors (TFTs) that are connected to each of the electrodes, and data lines and scanning lines both of which are connected to each of the TFTs and disposed in the directions parallel to a row direction and to a column direction, respectively.

The electro-optic device can further include a counter substrate facing the substrate. The counter substrate includes, for example, a counter electrode thereon facing the pixel electrodes. Furthermore, the electro-optic device can include, for example, a liquid crystal layer disposed between the pixel electrodes and the counter electrode. This structure of the electro-optic device allows image display. A predetermined potential difference between the pixel electrodes and the counter electrode appropriately changes the alignment of the liquid crystal molecules in the liquid crystal layer, thereby changing the transmission factor of the light that is transmitted through the liquid crystal layer. Thus, the electro-optic device can display images.

The substrate in the electro-optic device can include an image display area and a peripheral area. The image display area includes, for example, the scanning lines, the data lines, and the pixel electrodes. The peripheral area includes, for example, scanning line-driving circuits, a data line-driving circuit, and external circuit-connecting terminals that supply these circuits with predetermined signals.

SUMMARY OF THE INVENTION

Problems exist in known electro-optic devices. For example, a sealing member is generally used in the peripheral area so as to combine the substrate with the counter substrate. In terms of, for example, ease of handling and the relatively strong adhesive force, photo-curable resins are preferably used as the sealing member. In this case, in order to cure the sealing member, light must be radiated on the sealing member sandwiched between the substrate and the counter substrate. On the other hand, various wiring lines must be formed in the image display area and the peripheral area. Examples of the wiring lines include wiring lines that connect the scanning lines with the scanning line-driving circuits, wiring lines that connect data lines with the data line-driving circuit, wiring lines for a sampling circuit to preferably supply the data lines with image signals, and image signal lines that supply the image signals themselves. Accordingly, both the sealing member and the various wiring lines must be formed in the predetermined area of the peripheral area. Therefore, in order to cure the sealing member, a light path must be secured, for example, with predetermined clearances provided in the predetermined area.

Unfortunately, in the practical use of the completed electro-optic device having the structure, the light unintentionally leaks through, for example, the predetermined clearances provided as the light path. When the electro-optic device is used as a light valve of a projection display, such as a liquid crystal projector, light is radiated on the light valve and the light passing through the light valve is then projected, while being magnified onto a screen to display an image. However, if the predetermined clearances are provided in the predetermined area, the light leaking through the clearances becomes mixed with the light passing through the light valve. In this case, an image of the pattern, for example, of the various wiring lines is shown at the periphery of the image on the screen. This phenomenon deteriorates the quality of the image.

According to the known electro-optic device, storage capacitors are formed in the image display area in order to improve the holding property of the electrical potential at the pixel electrodes. Since one electrode (hereinafter may be referred to as capacitor electrode) that forms a storage capacitor preferably has a constant electrical potential, the capacitor electrode is connected to an external circuit-connecting terminal formed at the peripheral area. In this case, however, when the capacitor electrode and the external circuit-connecting terminal are connected through a contact hole, the contact hole often causes a high resistance. In addition, the properties vary depending on the contact holes. This structure increases the time constant of the capacitor electrode or that of the wiring line that extends from the capacitor electrode. Unfortunately, crosstalk is generated on the image. When the wiring is formed across the image display area, the crosstalk is observed as horizontal crosstalk.

It is an object of the invention to provide an electro-optic device that displays a high quality image. According to the electro-optic device of the invention, an unnecessary image caused by light leakage is not generated at the periphery of the image, and a predetermined electrical potential is adequately supplied to the capacitor electrodes. Furthermore, it is an object of the present invention to provide electronic equipment including the electro-optic device.

In order to solve the above problems, an electro-optic device according to a first aspect of the invention can include a substrate, data lines extending in one direction above the substrate, scanning lines extending in the direction orthogonal to the data lines above the substrate, switching elements to which scanning signals are supplied from the scanning lines, the switching elements being disposed above the substrate, pixel electrodes to which image signals are supplied from the data lines through the switching elements, the pixel electrodes being disposed above the substrate. In addition, the substrate has an image display area including the pixel electrodes and the switching elements, and a peripheral area at the periphery of the image display area. The electro-optic device according to the first aspect of the invention can further include storage capacitors holding an electrical potential at the pixel electrodes for a predetermined time, the storage capacitors being disposed above the image display area, first wiring that supplies capacitor electrodes of the storage capacitors with a predetermined electrical potential, the first wiring being disposed above the image display area, and a frame (i.e., frame-shaped pattern) formed as the same film as the first wiring, the frame being disposed at least a part of a frame area between the image display area and the peripheral area.

According to the electro-optic device of the invention, scanning signals are supplied to thin film transistors, which are an example of a switching element, through scanning lines to control the on and off state of the transistors. On the other hand, image signals are supplied to pixel electrodes through data lines. In response to the on/off control in the thin film transistor, the application/non-application of the image signals to the pixel electrodes is controlled. This control system provides the electro-optic device of the present invention with an active matrix driving system. The electro-optic device of the present invention further includes storage capacitors that maintain an electrical potential at the pixel electrodes for a predetermined time so as to improve the holding property of the electrical potential in the pixel electrodes.

According to the invention, in particular, the substrate includes an image display area and a peripheral area. The image display area includes the pixel electrodes, the switching elements, the storage capacitors, and a first wiring. In addition, a frame (i.e., frame-shaped pattern) is disposed at least a part of the peripheral area or a frame area disposed between the image display area and the peripheral area. A frame is formed as the same film as the first wiring. For example, when the image display area has a rectangular shape, the frame area is defined as a peripheral area of a rectangle having a predetermined width. In this case, the frame area has a rectangular shape in plan view. Viewed from the center of the image display area, the peripheral area is defined as an area outside the outer edge of this frame area having the rectangular shape. The above phrase formed as the same film means that in the manufacturing process of the electro-optic device, a common precursor film of the frame and the first wiring is formed at the same time; in addition, predetermined patterning processes, such as photolithography and etching, are performed on the precursor film at the same time.

The frame is disposed on at least a part of the frame area. The frame blocks light incident on the frame area. According to the invention, light leakage described in the above related art can be prevented in an area corresponding to the frame area. Consequently, the electro-optic device of the present invention can display higher quality images because the device prevents an image of a pattern of, for example, various wiring lines from showing at the periphery of the image.

According to the invention, the frame may be formed so as to electrically connect with the first wiring disposed above the image display area. Alternatively, the frame may be formed separately from the first wiring in the pattern.

According to the invention, the first wiring supplies the capacitor electrodes with a predetermined electrical potential. For this purpose, the first wiring is preferably, for example, connected to or continuous with the capacitor electrodes. The above phrase connected to the capacitor electrodes can mean that, for example, when the capacitor electrodes and the first wiring are formed as separate layers in a layered structure on the substrate, the capacitor electrodes may be electrically connected with the first wiring through contact holes. The above phrase continuous with the capacitor electrodes can mean, for example, a pattern having a continuous shape may be formed as the same layer of the capacitor electrodes. In other words, this pattern includes both a first wiring part and a capacitor electrode part in the plane to be formed.

In addition, the term frame (i.e., frame-shaped pattern) in the invention is a term used simply for the sake of convenience. Although the frame is disposed on the frame area, this does not always mean that the frame has a frame shape. In other words, the frame may be disposed on at least a part of the frame area. Furthermore, the frame may be disposed over the frame area and may reach on the peripheral area.

According to a second aspect of the present invention, the electro-optic device may further include a counter substrate opposing the substrate, and a sealing member for bonding the substrate with the counter substrate, wherein the frame is disposed on at least a part of a sealing area where the sealing member is disposed.

In this case, the substrate is bonded to the counter substrate with a sealing member composed of, for example, a photo-curable resin. If the frame area has the rectangular shape described above, the sealing area is disposed outside of the outer edge of the frame area. In this case, the sealing area may include the entirety or a part of the rectangular shape of the frame area. Alternatively, the sealing area need not include the rectangular shape of the frame area. In addition, the sealing area has a rectangular shape slightly larger than the rectangular shape of the frame area. In other words, the peripheral area includes at least a part of the sealing area.

Accordingly, the frame disposed even outside of the frame area blocks light incident on the sealing area. Consequently, the electro-optic device of the invention can display higher quality images because the device more effectively prevents an image of a pattern of, for example, various wiring lines from showing at the periphery of the image.

According to a third aspect of the electro-optic device of the invention, the electro-optic device may further include a counter substrate opposing the substrate, and a counter electrode disposed above the counter substrate. The frame has a connecting portion electrically connected with the counter electrode. In this case, the frame includes a connecting portion electrically connected with the counter electrode. Since the frame is electrically connected with the counter electrode, both the frame and the counter electrode always have the same electrical potential. Thus, the frame has two functions, i.e., a function for preventing light leakage and a function for supplying the counter electrode with an electrical potential. The device structure can be simplified due to the functions of the frame.

According to a fourth aspect of the electro-optic device of the present invention, the frame may be formed so as to electrically connect with the first wiring. In this case, the frame and the first wiring always have the same electrical potential. Thus, the frame has two functions, i.e., a function for preventing light leakage and a function for supplying the first wiring with an electrical potential. The device structure can be simplified due to the functions of the frame. As described above, the frame and the first wiring are formed as the same film. The above phrase the frame may be formed so as to electrically connect with the first wiring typically includes the meaning that a common precursor film of the frame and the first wiring is formed and patterned without separating the frame from the first wiring. In other words, this pattern includes both a frame part and a first wiring part in a continuous plane.

In addition to the fourth aspect, when the frame is electrically connected with the counter electrode as described in the third aspect, the frame, the counter electrode, and the first wiring always have the same electrical potential. Obviously, according to this structure, the device structure can be simplified more readily.

According to the third aspect in which the frame includes the connecting portion, the connecting portion may be disposed at a corner of the counter substrate.

According to this structure, for example, when the image display area has a rectangular shape, the connecting portion can be disposed at four corners of the image display area, at four corners of the frame area disposed at the periphery of the image display area, or at four corners of the sealing area disposed outside of the frame area. This structure reliably allows the frame to be electrically connected with the counter electrode, while advantageously preventing an adverse effect in the image display.

The above term corner may include four corners of the counter substrate itself. The corners may further include a certain amount of extending portion from each of the corners, for example, a concentric portion having the corner as the center. The above phrase may be disposed at a corner can include the meaning that the connecting portion may be disposed at all the four corners or may be disposed at three corners or less of the image display area.

According to a fifth aspect of the electro-optic device of the present invention, the frame may surround the entire periphery of the image display area. In this case, since the frame surrounds the entire periphery of the image display area, this structure completely blocks light incident on the frame area or the sealing area. The electro-optic device of the present invention effectively prevents light leakage and displays higher quality images.

In addition, when the frame surrounding the entire periphery of the image display area has the connecting portion connecting to the counter electrode, the frame can be electrically connected with the counter electrode more reliably. This can be advantageous because the entire area of the frame is electrically connected, in other words, the frame is disposed as a continuous pattern. In addition, as described above, a plurality of the connecting portions can be disposed at the four corners of the image display area, i.e., the four corners of the frame or the sealing area. Accordingly, even if a part of the frame or some of the connecting portion is not electrically connected for some reason, the other portions can satisfactorily achieve electrical connection. In other words, the frame and the connecting portions on the frame form a sufficiently large connecting area. In this case, the counter electrode maintains a significantly stable electrical potential. Therefore, the alignment of the liquid crystal molecules in the liquid crystal layer, which is an example of electro-optic material, disposed between the counter electrode and the pixel electrodes, can be preferably adjusted. Accordingly, the electro-optic device displays a high quality image.

According to the third aspect in which the frame has a connecting portion electrically connected with the counter electrode, the image display area may have a rectangular shape in plan view, the frame may have a first pattern along three continuous sides of the rectangle and a second pattern along the remaining side of the rectangle and separate from the first pattern, and the connecting portion may be disposed on the first pattern.

According to this structure, the frame includes a first pattern disposed along three continuous sides of the rectangular image display area. In addition, the connecting portion is disposed on the first pattern. The frame is electrically connected with the counter electrode more reliably, as in the above-described case where the frame surrounds the entire periphery of the image display area. In this case, the counter electrode maintains a significantly stable electrical potential.

According to this structure, in addition to the first pattern, the frame further includes a second pattern along the remaining side of the rectangular image display area, the second pattern being disposed separately from the first pattern. This structure can have the following advantage, for example, when the second pattern is disposed on an area corresponding to an area where a data line-driving circuit is disposed, capacitive coupling may be generated between image signal lines and the counter electrode disposed on the counter substrate. The image signal lines are connected to a sampling circuit controlled by a data line-driving circuit. When capacitive coupling occurs, the electrical connection to one component unintentionally changes the electrical potential at the other component. Therefore, unfortunately, it is difficult to display the desired images. According to the above structure, the second pattern is disposed on the area described above. That is, the second pattern disposed between the image signal lines and the counter electrode suppresses the generation of capacitive coupling. Accordingly, desired images can be displayed preferably.

Needless to say that this advantage can be achieved as well in the fifth aspect, in which the frame surrounds the entire periphery of the image display area.

The above terms first pattern, second pattern, and terms third pattern to sixth pattern to be described later simply represent patterns that are individually defined in a semiconductor manufacturing process. (In other words, terms "A" to "F" used as reference numerals in embodiments to be described later just represent these names.)

The image display area may have a rectangular shape in plan view, the frame may have a third pattern along two opposing sides of the rectangle and a fourth pattern along the remaining two sides of the rectangle and separate from the third pattern, and the connecting portion may be disposed on the third pattern.

According to this structure, the frame includes the third pattern disposed along two opposing sides of the rectangular image display area; in addition, the connecting portion is disposed on the third pattern. Referring to the above description, the third pattern generally includes two linear wiring lines formed separately. In this case, each of the two linear wiring lines includes at least two connecting portions. Accordingly, the frame is electrically connected with the counter electrode more reliably.

According to this structure, in addition to the third pattern, the frame may further include a fourth pattern along the remaining two sides of the rectangular image display area, the fourth pattern being disposed separately from the third pattern. As in the case of the second pattern, for example, when the fourth pattern is disposed on an area corresponding to an area where the data line-driving circuit is disposed, this structure prevents capacitive coupling from generating between image signal lines and the counter electrode.

The image display area may have a rectangular shape in plan view, the frame may have a fifth pattern continuously formed around the rectangle except for a corner of the rectangle and a sixth pattern disposed at the corner and separate from the fifth pattern, and the connecting portion may be disposed on at least one of the fifth pattern and the sixth pattern.

According to this structure, the frame includes a fifth pattern continuously disposed along the rectangular image display area except for a corner of the rectangular image display area; in addition, the connecting portion may be disposed on the fifth pattern. Accordingly, the fifth pattern typically includes three connecting portions thereon.

According to the third aspect of the invention, in addition to the fifth pattern, the frame further includes a sixth pattern disposed at the corner, the sixth pattern being disposed separately from the fifth pattern. In addition, the connecting portion may be disposed on the sixth pattern. Accordingly, the sixth pattern typically includes a single connecting portion thereon.

Accordingly, the advantages described above can be achieved: The frame is electrically connected with the counter electrode reliably and the generation of capacitive coupling between image signal lines and the counter electrode is prevented.

Obviously, the various modifications of the frame described in the above aspects increase the allowable variation in forming the frame. These modifications readily arrange various wiring (or patterning) for connecting external circuit-connecting terminals with a data line-driving circuit, a scanning line-driving circuit, or the connecting portion.

According to a sixth aspect of the electro-optic device of the invention, the electro-optic device may further include external circuit-connecting terminals along an edge of the substrate, the external circuit-connecting terminals being disposed above the peripheral area; and second wiring being continuous with the external circuit-connecting terminals, the second wiring being disposed above the peripheral area. At least a part of the second wiring may be formed as the same film as the first wiring and may be formed so as to electrically connect with the first wiring.

According to this structure, external circuit-connecting terminals and the second wiring are disposed above the peripheral area. In addition, at least a part of the second wiring is formed as the same film as the first wiring and is formed so as to electrically connect with the first wiring. The above phrase formed as the same film has the same meaning, as in the frame and the first wiring. Accordingly, at least a part of the second wiring and the first wiring are formed in the same layer in a layered structure including, for example, the data lines, the scanning lines, and the pixel electrodes, and are composed of the same materials. Since the first wiring and the frame are formed as the same film in the invention, the first wiring, the frame, and the second wiring are formed as the same film.

First, since the external circuit-connecting terminals, the second wiring, and the first wiring can be formed as the same layer, electrical resistances between these components can be decreased.

In a known art, the above components are formed on separate layers and are electrically connected through, for example, contact holes. Unfortunately, the contact holes often cause a high resistance. In addition, properties vary depending on the contact holes. These phenomena increase the time constant of the capacitor electrode or that of the wiring extending from the capacitor electrode and consequently generate crosstalk in an image. When the wiring is formed across the image display area, the crosstalk is observed as horizontal crosstalk.

As described above, according to this structure, the above problems are prevented because the external circuit-connecting terminals, the second wiring, and the first wiring can be formed on the same layer.

Secondly, an electro-optic device including the sixth aspect, the third aspect in which the frame includes a connecting portion, the fifth aspect in which the frame surrounds the entire periphery of the image display area, and the third aspect in which the frame includes the first pattern, the second pattern, the third pattern, the fourth pattern, the fifth pattern, and the sixth pattern has the following special advantage. (Such an aspect of the above electro-optic device is hereinafter referred to as a combined aspect.) According to the electro-optic device of the combined aspect, since the frame includes a connecting portion disposed between the frame and the counter electrode, the frame has two functions, i.e., a function for preventing light leakage and a function as wiring for supplying the counter electrode with a predetermined electrical potential. According to the combined aspect, the frame, the second wiring, and the first wiring are formed as the same film, thereby decreasing the electrical resistance between these components and the external circuit-connecting terminals.

The electro-optic device according to the combined aspect has a low electrical resistance from the external circuit-connecting terminals to the second wiring and the frame. Therefore, the electro-optic device can maintain a stable electrical potential of the frame. In addition, the electro-optic device can maintain a stable electrical potential of the counter electrode. Furthermore, since the first wiring can be electrically connected with the frame, the electro-optic device can maintain a stable electrical potential of the first wiring; in addition, the electro-optic device can maintain a stable electrical potential of the capacitor electrodes connected to or continuous with the first wiring.

According to the combined aspect of the present invention, the frame, the second wiring, and the first wiring are formed as the same film and are formed so as to electrically connect with each other. In addition, the frame includes the connecting portion. Consequently, the electro-optic device according to the combined aspect includes two more effective advantages, i.e., the advantage according to the sixth aspect (i.e., decreasing the electrical resistance) and the advantage due to the connecting portion (i.e., the function for supplying the counter electrode with an electrical potential).

The first wiring may be disposed above the data lines with a first insulating interlayer disposed therebetween. According to this structure, a layered structure having, for example, scanning lines, data lines, pixel electrodes, and external circuit-connecting terminals can be adequately formed on the substrate.

The external circuit-connecting terminals are preferably formed as a relatively upper layer in the layered structure because the external circuit-connecting terminals include externally exposed electrodes. Otherwise, deep contact holes must be formed so as to connect the top layer in the layered structure with the electrodes. According to this structure, since the first wiring is disposed on the data lines, the second wiring being formed as the same film as the first wiring and connected to or continuous with the external circuit-connecting terminals is also formed on the data lines. Therefore, the second wiring is formed as a relatively upper layer in the layered structure.

Accordingly, even if the external circuit-connecting terminals are formed as the relatively upper layer, the second wiring connected to or continuous with the external circuit-connecting terminals is also formed as a relatively upper layer. Thus, the two components can be electrically connected without difficulty. This structure allows the layered structure to be adequately formed on the substrate.

The first wiring may be disposed directly under a layer having the pixel electrodes. According to this structure, the external circuit-connecting terminals and the second wiring can be electrically connected more satisfactorily. The pixel electrodes must be facing an electro-optic material layer. In this point of view, when the first wiring is directly disposed under the layer having the pixel electrodes, typically, a single insulating layer is disposed between the first wiring and the pixel electrodes, viewed from the electro-optic material layer. In this case, since the second wiring, which is formed as the same film as the first wiring, is also formed directly under the layer having the pixel electrodes, only the insulating layer is generally disposed on the second wiring. This is because, in general, the surface of the insulating layer disposed directly under the pixel electrodes is externally exposed in the peripheral area.

Accordingly, the electrodes of the external circuit-connecting terminals are externally exposed very readily. The electrodes may be electrically connected with the second wiring by extending the second wiring from the electrodes. Thus, the external circuit-connecting terminals can be electrically connected with the second wiring without difficulty.

In addition, according to the sixth aspect in which the electro-optic device includes the second wiring, the first wiring need not electrically connected with the frame, a first portion of the second wiring may be electrically connected with the first wiring, a second portion of the second wiring may be electrically connected with the frame, the first portion may be connected with a first portion of the external circuit-connecting terminals, and the second portion may be connected with a second portion of the external circuit-connecting terminals.

According to this structure, the frame and the first wiring maintain different electrical potentials. In this case, the first wiring has a function to supply capacitor electrodes with a predetermined electrical potential, and the counter electrode is connected with the frame. From this point of view, the fact that the frame and the first wiring maintain different electrical potentials is equivalent to the fact that the capacitor electrodes and the counter electrode maintain different electrical potentials. The reason is that when a first electrical potential is supplied to the first portion of the external circuit-connecting terminals, the capacitor electrodes maintain the first electrical potential because the first portion is connected with the first portion of the second wiring, the first wiring, and the capacitor electrodes. When a second electrical potential, which is different from the first electrical potential, is supplied to the second portion of the external circuit-connecting terminals, the counter electrode maintains the second electrical potential because the second portion is connected with the second portion of the second wiring, the frame, and the counter electrode. The embodiment of these concepts will be described later in a fifth embodiment in the detailed description of the preferred embodiments.

The electro-optic device according to this structure can suitably adjust various electrical effects.

According to a seventh aspect of the invention, the first wiring may be composed of a light-shielding material. The first wiring is connected to or continuous with the capacitor electrodes, and is formed in the image display area. Accordingly, light incident on an area corresponding to the first wiring can be shielded in the image display area. This structure prevents unintentional light incidence on a semiconductor layer (active layer) of thin film transistors, which are examples of the switching elements. Consequently, this structure suppresses the generation of photo leakage current in the semiconductor layer, and prevents the generation of, for example, flickering on the image.

The second wiring, which is formed as the same film as the first wiring, is also composed of the light-shielding material. Accordingly, thin film transistors, i.e., the switching elements, disposed above the peripheral area also have the same advantage described above. This structure allows accurate operation of the thin film transistors.

Furthermore, the frame, which is formed as the same film as the first wiring, is also composed of the light-shielding material. Consequently, this structure provides the light-shielding effect more reliably.

Examples of the light-shielding material include aluminum (Al) having a relatively large optical reflectance, at least one high melting point metal selected from the group consisting of titanium (Ti), chromium (Cr), tungsten (W), tantalum (Ta), and molybdenum (Mo), an alloy thereof; a metal silicide thereof; a polysilicide thereof, and a layered structure thereof.

According to an eighth aspect of the present invention, the first wiring may have a layered structure composed of different materials. For example, the first wiring includes two films, i.e., a lower aluminum film and an upper titanium nitride film. The lower aluminum film provides a light-shielding property due to a high electrical conductivity and a relatively high optical reflectance. The function of the upper titanium nitride film is that when a precursor film of, such as, an insulating interlayer is patterned on a first wiring, or when contact holes are formed through the insulation interlayer, the upper titanium nitride film prevents overetching. In other words, the upper titanium nitride film functions as an etch stop.

Since the first wiring has a layered structure, in addition to a function to supply capacitor electrodes with an electrical potential, a new function can be added to the first wiring to provide high performance.

In addition to the layered structure described above, the layered structure in this aspect of the invention includes various modifications. Accordingly, the second wiring and the frame, both of which are formed as the same film as the first wiring, are also have a layered structure composed of different materials. The materials in the layered structure are adequately selected so as to add a new function, in view of the functions of the second wiring and the frame (i.e., a function of the second wiring for connecting external circuit-connecting terminals with a scanning line-driving circuit and a data line-driving circuit, and a function of the frame for relaying an electrical potential supplying from the second wiring to the first wiring). The above two-layered structure including aluminum, which is an example of a low resistance material, is preferable from this point of view.

According to a ninth aspect of the invention, the electro-optic device may further include a counter substrate opposing the substrate; and a light-shielding film above the counter substrate, wherein the frame is disposed below the light-shielding film.

According to this structure, for example, in the frame area, light incident from the counter substrate to the substrate is blocked, at first, by the light-shielding film, and subsequently, by the frame. This structure provides a double light-shielding effect, and provides the light-shielding effect more reliably.

The light-shielding film may include a frame-shaped light-shielding film disposed around the periphery of the counter substrate.

According to this structure, the double light-shielding effect can be achieved more reliably because the light-shielding film includes the frame-shaped light-shielding film.

In order to solve the above problems, electronic equipment of the present invention includes the above electro-optic device of the present invention. (The electro-optic device includes the above various modifications.)

The electronic equipment of the invention includes the electro-optic device of the present invention. Accordingly, the electronic equipment of the present invention prevents an image of a pattern of, for example, the various wiring lines from being shown at the periphery of the image. The invention provides electronic equipment that can display high quality images. Examples of the electronic equipment include projectors, liquid crystal televisions, cell phones, electronic notebooks, word processors, video cameras having a viewfinder or a direct-view monitor, workstations, videophones, POS terminals, and touch panels.

These functions and other benefits of the invention are clarified by embodiments described below.

BRIEF DESCRIPTION OF THE DRAWINGS

The invention will be described with reference to the accompanying drawings, wherein like numerals reference like elements, and wherein:

FIG. 7(a) is an enlarged view of the inside of a circle represented by symbol Z in FIG. 2, and FIG. 7(b) is a sectional view showing a part where a conductive member 106 is disposed in FIG. 1;

DETAILED DESCRIPTION OF PREFERRED EMBODIMENTS

The embodiments of the invention will now be described with reference to the drawings. In the following embodiments, an electro-optic device of the invention is applied to a liquid crystal device.

Figure 1:
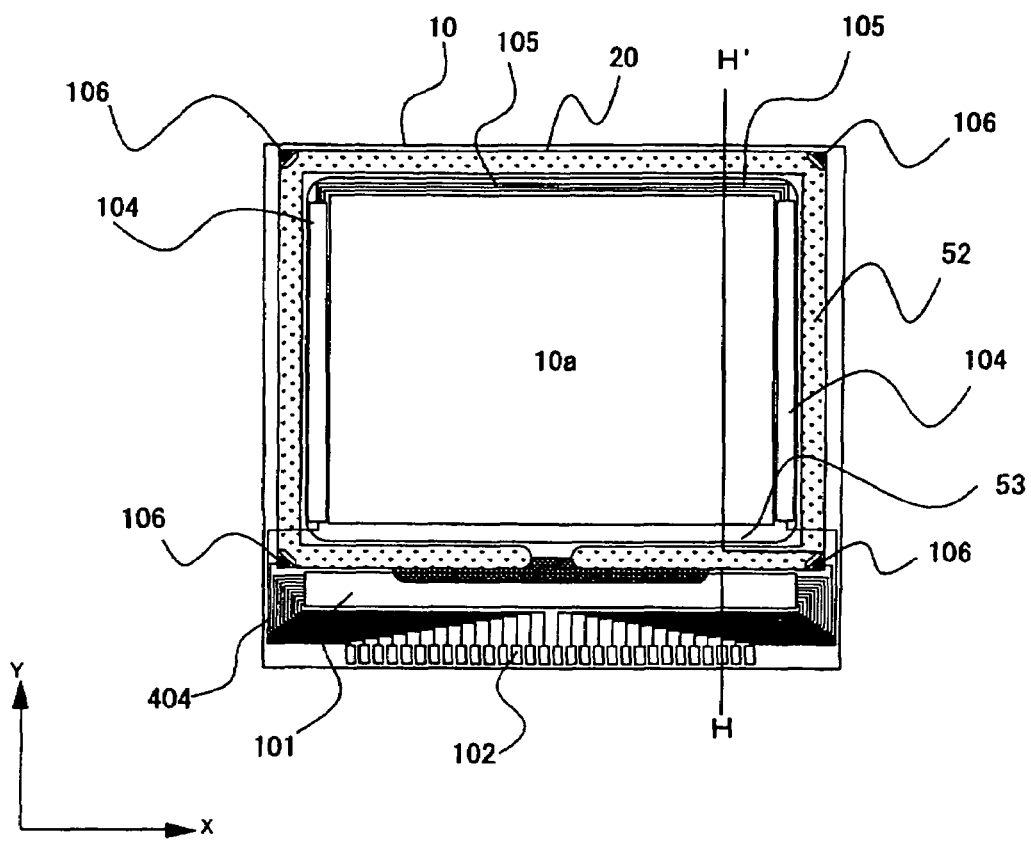
FIG. 1 is a plan view of an electro-optic device including a TFT array substrate and components formed thereon, viewed from a direction of a counter substrate.
Figure 2:
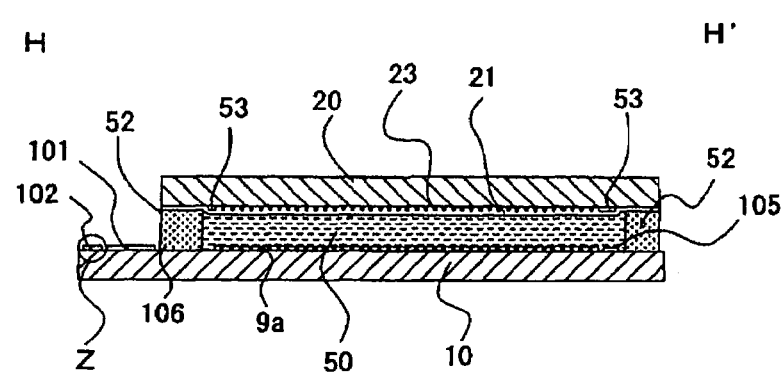
FIG. 2 is a sectional view taken along line H-H' of FIG. 1.

The overall structure of a first embodiment according to an electro-optic device of the invention will now be described with reference to FIGS. 1 and 2. FIG. 1 is a plan view of the electro-optic device including a TFT array substrate and components formed thereon, viewed from a direction of a counter substrate. FIG. 2 is a sectional view taken along line H-H' of FIG. 1. In this embodiment, a liquid crystal device driven by a TFT active matrix driving system and having a built-in driving circuit is used as an example of the electro-optic device.

Referring to FIGS. 1 and 2, a TFT array substrate 10 and a counter substrate 20 are disposed facing each other. A liquid crystal layer 50 is filled between the TFT array substrate 10 and the counter substrate 20. The TFT array substrate 10 and the counter substrate 20 are bonded each other by a sealing member 52 in a sealing area disposed around an image display area 10a.

The sealing member 52 is composed of, for example, an ultraviolet (UV) curable resin or a thermosetting resin for bonding both of the substrates together. The sealing member 52 is applied on the TFT array substrate 10 and is then cured by, for example, ultraviolet irradiation or heating in the manufacturing process. In the sealing member 52, a gap material, such as glass fibers or glass beads are dispersed so that a clearance between the TFT array substrate 10 and the counter substrate 20 (a gap between the substrates) has a predetermined value. The electro-optic device of the first embodiment is suitable use as a light valve of a compact projector producing an enlarged display.

A frame-shaped light-shielding film 53 is disposed adjacent to the counter substrate 20 and in parallel with inside of the sealing area having the sealing member 52. The frame-shaped light-shielding film 53 has a light-shielding property and defines a frame area of the image display area 10a. A part of or the entire part of the frame-shaped light-shielding film 53 may be disposed adjacent to the TFT array substrate 10 as a built-in light-shielding film. According to the first embodiment, a peripheral area that defines the periphery of the image display area 10a is formed. In other words, in particular according to the first embodiment, when the device is viewed from the center of the TFT array substrate 10, the area outside this frame-shaped light-shielding film 53 is defined as the peripheral area.

According to the peripheral area, at the outside of the sealing area having the sealing member 52, a data line-driving circuit 101 and external circuit-connecting terminals 102 are disposed along one side of the TFT array substrate 10. Scanning line-driving circuits 104 are disposed along two sides adjacent to the above one side, and are disposed such that the scanning line-driving circuits 104 are covered with the frame-shaped light-shielding film 53. Furthermore, in order to connect the two scanning line-driving circuits 104 disposed at both sides of the image display area 10a, connecting wiring 105 are disposed along the remaining side of the TFT array substrate 10, and are disposed such that the connecting wiring 105 is covered with the frame-shaped light-shielding film 53. The data line-driving circuit 101 and the scanning line-driving circuits 104 are connected with the external circuit-connecting terminals 102 through wiring 404.

In addition, conductive members 106 are disposed at the four corners of the counter substrate 20. The conductive members 106 function as conductive terminals that connect the two substrates together. The conductive members 106 include, for example, aggregated conductive particles such as silver particles. On the other hand, on the TFT array substrate 10, conductive terminals are disposed at the positions facing these corners. Thus, the TFT array substrate 10 is electrically connected with the counter substrate 20.

Referring to FIG. 2, pixel-switching TFTs, scanning lines, and data lines are disposed on the TFT array substrate 10. In addition, pixel electrodes 9a are disposed thereon. Furthermore, an alignment film is disposed on the pixel electrodes 9a. On the other hand, a counter electrode 21 and a grid or strip-shaped light-shielding film 23 are disposed on the counter substrate 20. Furthermore, an alignment film is formed at the top layer on the counter substrate 20. A liquid crystal layer 50 is disposed between the pair of alignment films and is aligned in a predetermined direction. The liquid crystal layer 50 is composed of a nematic liquid crystal or a mixture of two or more nematic liquid crystals.

According to the electro-optic device having the above-described overall structure in the first embodiment, among the above components, for example, the structures of the wiring 404 and the conductive members 106 have specific features. These features will be described below in greater detail with reference to, for example, FIG. 7.

In addition to the data line-driving circuit 101 and the scanning line-driving circuits 104, a sampling circuit, a pre-charge circuit, and an inspection circuit may be formed on the TFT array substrate 10 shown in FIGS. 1 and 2. The sampling circuit samples image signals on image signal lines and supplies data lines with the image signals. Preceding the image signals, the pre-charge circuit supplies a plurality of data lines with pre-charge signals having a predetermined voltage level. The inspection circuit is used for inspecting, for example, the quality and the defects of the electro-optic device during the manufacturing process or before shipping.

Figure 3:
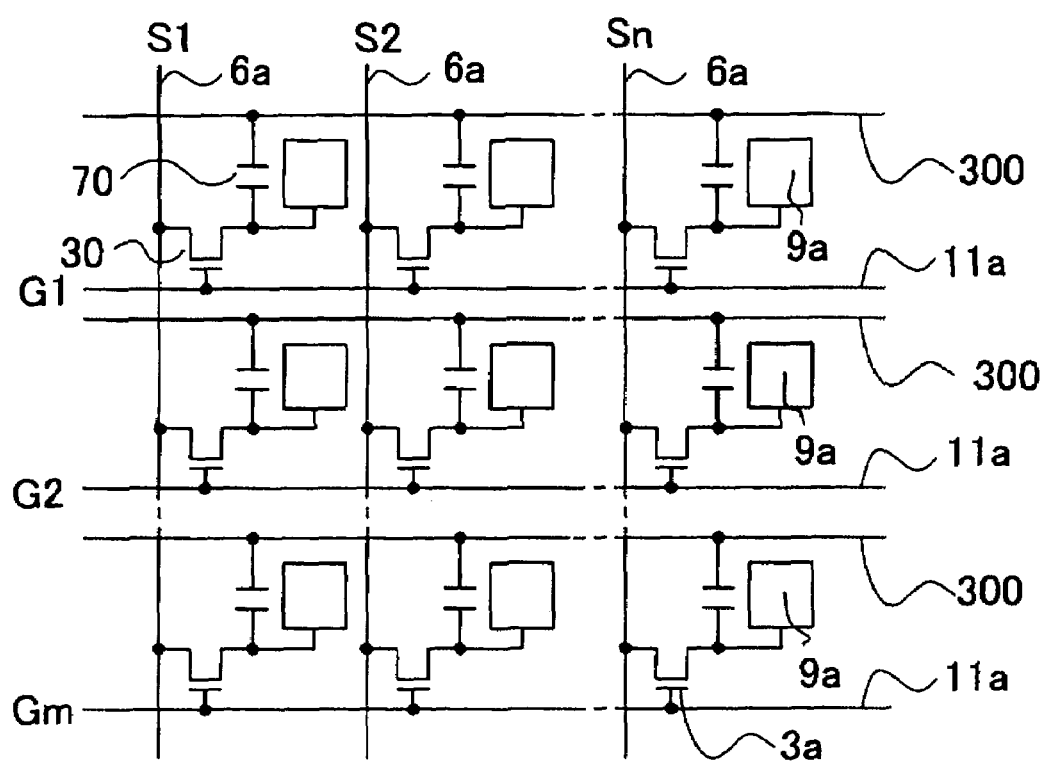
FIG. 3 is an equivalent circuit diagram of, for example, various elements and wiring lines in a plurality of pixels arranged in a matrix, the pixels being formed at an image display area of the electro-optic device.
Figure 4:
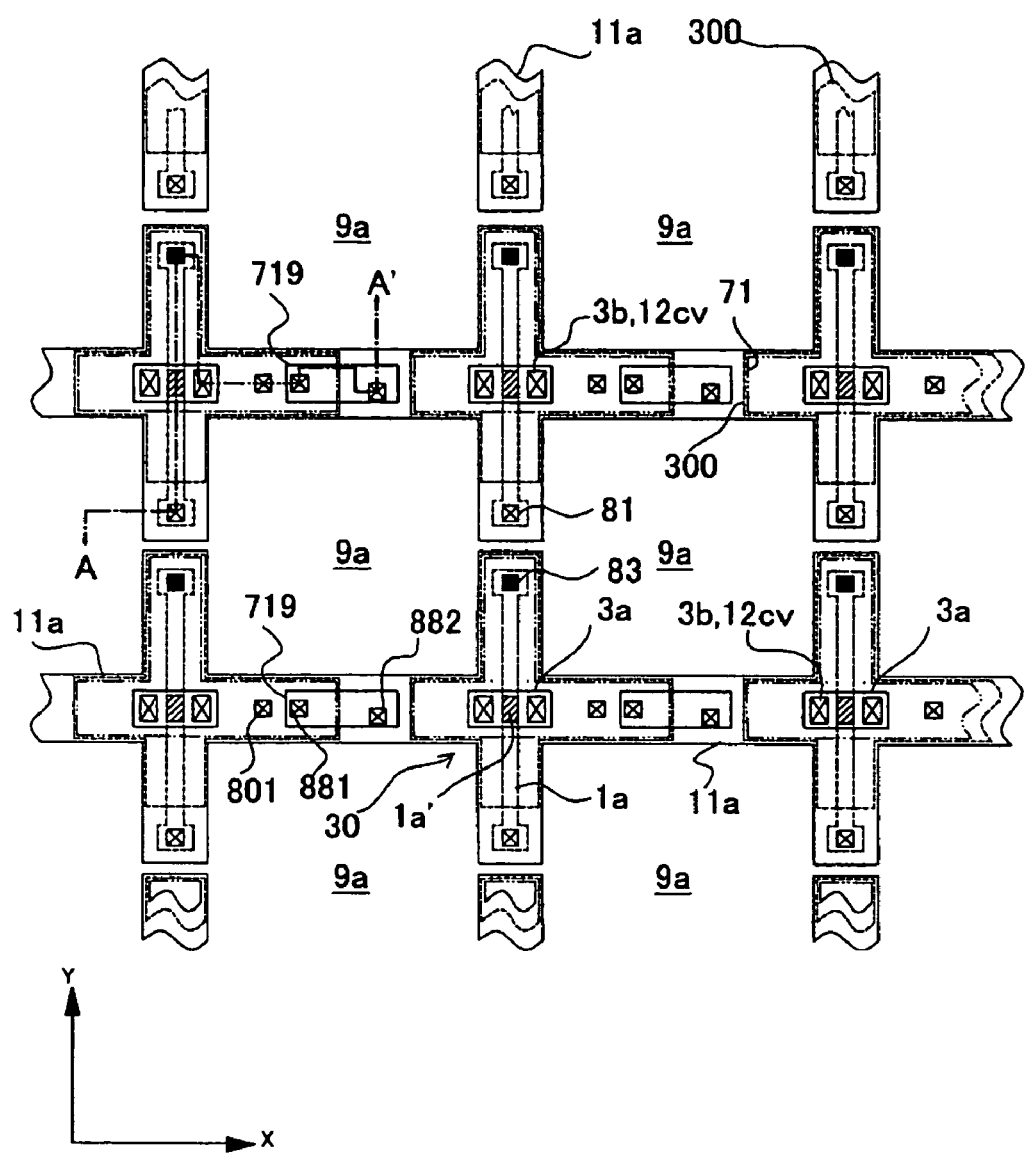
FIG. 4 is a plan view of a plurality of adjacent pixels on the TFT array substrate having, for example, data lines, scanning lines, and pixel electrodes thereon, and only showing the lower part (the lower part showing from the bottom to the reference numeral 70 (storage capacitor) in FIG. 6)
Figure 5:
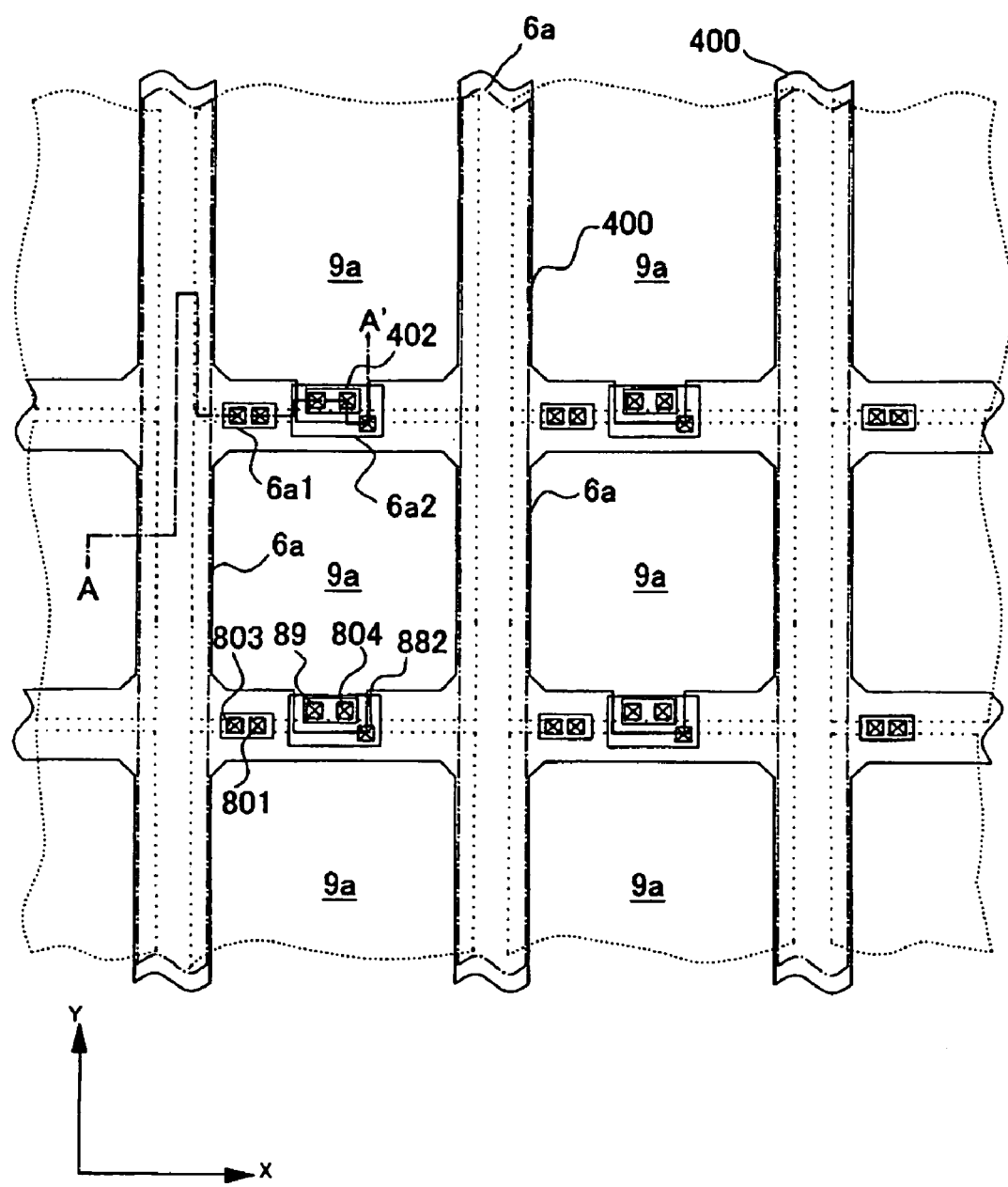
FIG. 5 is a plan view of a plurality of adjacent pixels on the TFT array substrate having, for example, the data lines, the scanning lines, and the pixel electrodes thereon, and only showing the upper part (the upper part showing over the reference numeral 70 (storage capacitor) to the top in FIG. 6)

The structure of a pixel part in the electro-optic device according to the first embodiment of the invention will now be described with reference to FIGS. 3 to 7. FIG. 3 is an exemplary circuit diagram of, for example, various elements and wiring lines in a plurality of pixels arranged in a matrix, the pixels being formed at an image display area of the electro-optic device. FIGS. 4 and 5 are plan views of a plurality of adjacent pixels on the TFT array substrate having, for example, data lines, scanning lines, and pixel electrodes thereon. FIGS. 4 and 5 separately show the lower part (FIG. 4) and the upper part (FIG. 5) of a layered structure to be described later.

Figure 6:
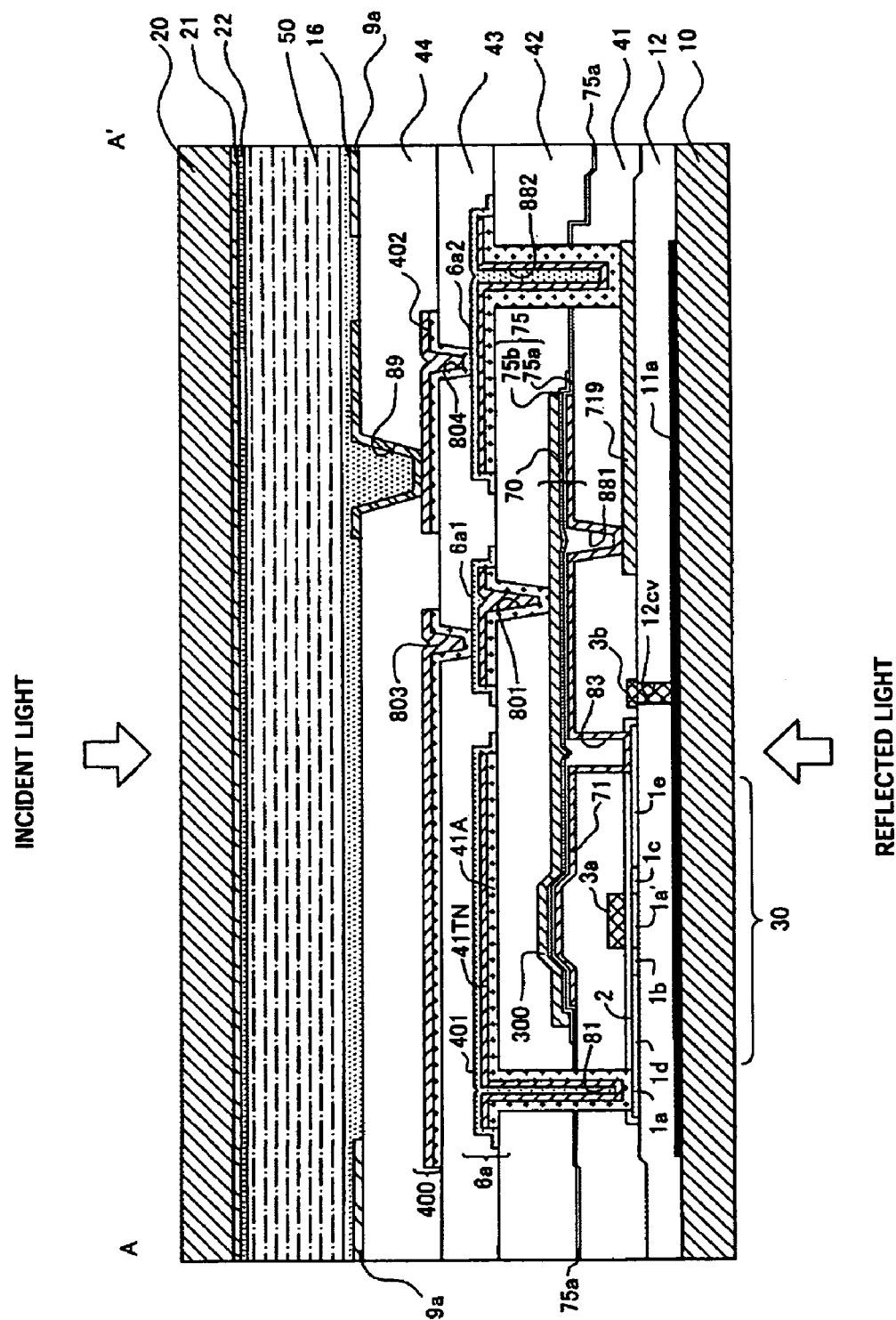
FIG. 6 is a sectional view taken along line A-A' of a figure combining FIG. 4 and FIG. 5.
Figure 7A:
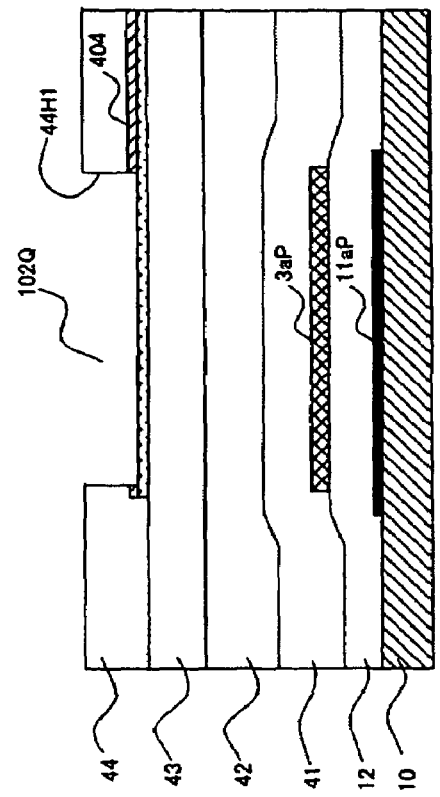
FIGS. 7(a) and 7(b) are sectional views corresponding to the layered structure shown in FIG. 6.
Figure 7B:
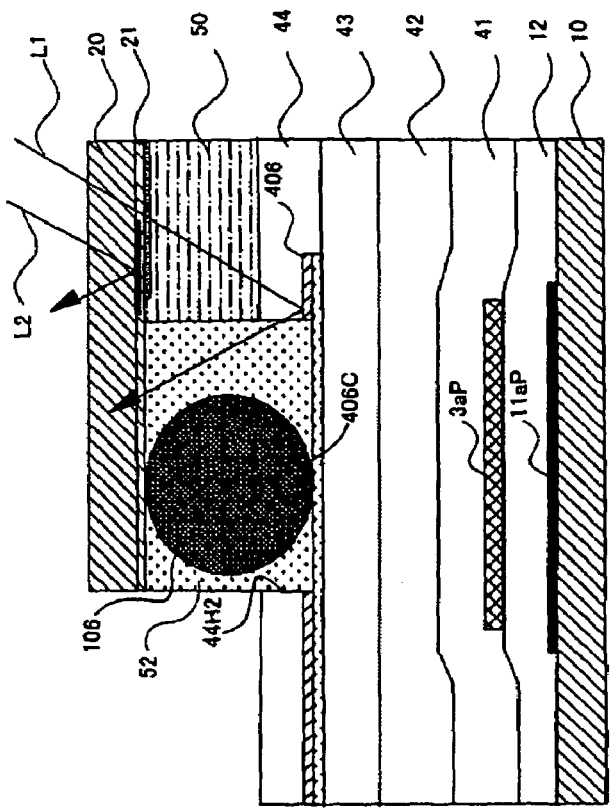

FIG. 6 is a sectional view taken along line A-A' of a figure combining FIG. 4 and FIG. 5. FIG. 7(a) is an enlarged view of the inside of a circle represented by symbol Z in FIG. 2. FIG. 7(b) is a sectional view showing a part where a conductive member 106 is disposed in FIG. 1. FIGS. 7(a) and 7(b) are sectional views corresponding to the layered structure shown in FIG. 6. In FIGS. 6 and 7, reduction scales of each of the layers and each of the components are different so that the layers and the components have dimensions that can be recognized in the figure.

Referring to FIG. 3, in a plurality of pixels formed in a matrix and formed at an image display area of the electro-optic device, pixel electrodes 9a and TFTs 30 that control the switching of the pixel electrodes 9a are formed. Data lines 6a to which image signals are supplied are electrically connected to corresponding sources of the TFTs 30. The image signals S1, S2, ..., and Sn that are written in the data lines 6a may be supplied sequentially line-by-line in this order or may be supplied in groups for a plurality of data lines 6a adjacent to each other.

Gate electrodes 3a are electrically connected to corresponding gates of the TFTs 30. Scanning signals G1, G2, ..., and Gm are applied to the scanning lines 11a and the gate electrodes 3a sequentially line-by-line in this order as pulses with a predetermined timing. Each of the pixel electrodes 9a is electrically connected to corresponding drains of the TFTs 30. In the TFTs 30, i.e., switching elements, the switch is closed for a predetermined period of time, thereby writing the image signals S1, S2, ..., and Sn that are supplied from the data lines 6a with a predetermined timing.

Thus, the image signals S1, S2, ..., and Sn having a predetermined level are written in the liquid crystal, which is an example of an electro-optic material, via the pixel electrodes 9a. The image signals are held for a predetermined period of time at the counter electrode formed on the counter substrate. The alignment and the order of the liquid crystal molecules change depending on the applied voltage level. The change modulates light and allows gray scale display. In a normally white mode, the transmission factor of the incident light is decreased depending on the voltage applied to each of the pixels. In a normally black mode, the transmission factor of the incident light is increased depending on the voltage applied to each of the pixels. On the whole, light that has intensity corresponding to the image signals is emitted from the electro-optic device.

In order to prevent the leakage of the held image signals, storage capacitors 70 are added in parallel with liquid crystal capacitors formed between the pixel electrodes 9a and the counter electrode. The storage capacitors 70 are disposed along with the scanning lines 11a and include capacitor electrodes 300. The capacitor electrodes 300 include capacitor electrodes at a fixed electrical potential, and the electrical potential of the capacitor electrodes 300 are fixed at the constant potential.

The structure of the electro-optic device will now be described with reference to FIGS. 4 to 7. In the electro-optic device, the circuit operation is performed by, for example, the data lines 6a, the scanning lines 11a, the gate electrodes 3a, and the TFTs 30.

Referring to FIGS. 4 and 5, a plurality of pixel electrodes 9a is disposed in a matrix on the TFT array substrate 10 (outlines of the pixel electrodes 9a are shown by a dotted line). The data lines 6a and the scanning lines 11a are disposed along each of the vertical and horizontal boundaries of the pixel electrodes 9a. The data lines 6a have a layered structure having, for example, an aluminum film, as described in greater detail below. The scanning lines 11a are composed of, for example, a conductive polysilicon film. The scanning lines 11a are electrically connected to the gate electrodes 3a via contact holes 12cv. Each of the gate electrodes 3a faces corresponding channel regions 1a', represented by areas with slanted lines directed upward to the right in FIG. 4. The scanning lines 11a include the gate electrodes 3a. That is, the pixel switching TFTs 30 are disposed at each of the cross points of the gate electrodes 3a and the data lines 6a. In the TFTs 30, the gate electrodes 3a that are included in the scanning lines 11a are disposed facing the channel regions 1a'. Accordingly, the TFTs 30 (except for the gate electrodes) are disposed between the gate electrodes 3a and the scanning lines 11a.

As shown in FIG. 6, i.e., a sectional view taken along line A-A' of FIGS. 4 and 5, the electro-optic device includes the TFT array substrate 10 composed of, for example, a quartz substrate, a glass substrate, or a silicon substrate, and a counter substrate 20 composed of, for example, a glass substrate or a quartz substrate. The counter substrate 20 is disposed facing the TFT array substrate 10.

Referring to FIG. 6, the pixel electrodes 9a are formed on the inner face (adjacent to the TFT array substrate 10). An alignment film 16 processed by a predetermined alignment treatment, such as a rubbing treatment is formed on the pixel electrodes 9a. The pixel electrodes 9a are composed of, for example, a transparent conductive film, such as an ITO film. On the other hand, the counter electrode 21 is formed on the entire surface adjacent to the counter substrate 20. An alignment film 22 processed by a predetermined alignment treatment, such as a rubbing treatment, is formed below the counter electrode 21. The counter electrode 21 is composed of, for example, a transparent conductive film, such as an ITO film, as well as the pixel electrodes 9a.

An electro-optic material, such as a liquid crystal, is filled in a space between the TFT array substrate 10 and the counter substrate 20, both of which face each other, and the space surrounded by the sealing member 52 (see FIGS. 1 and 2). Thus, the liquid crystal layer 50 is formed. When an electric field from the pixel electrodes 9a is not applied, the liquid crystal layer 50 is aligned in a predetermined direction because of the function of the alignment films 16 and 22.

Various components including the pixel electrodes 9a and the alignment film 16, and having a layered structure are disposed on the TFT array substrate 10. As shown in FIG. 6, the layered structure is composed of, from the bottom, a first layer including the scanning lines 11a, a second layer including, for example, the TFTs 30 having the gate electrodes 3a, a third layer including the storage capacitors 70, a fourth layer including, for example, the data lines 6a, a fifth layer including, for example, capacitor wiring 400, which is an example of first wiring in the present invention, and a sixth layer (i.e., top layer) including, for example, the pixel electrodes 9a and the alignment film 16. An insulating underlayer 12 is formed between the first layer and the second layer, a first insulating interlayer 41 is formed between the second layer and the third layer, a second insulating interlayer 42 is formed between the third layer and the fourth layer, a third insulating interlayer 43 is formed between the fourth layer and the fifth layer, and a fourth insulating interlayer 44 is formed between the fifth layer and the sixth layer in order to prevent short-circuiting between the components. In addition, for example, contact holes that electrically connect heavily doped source regions 1d in the semiconductor layer 1a of the TFTs 30 with the data lines 6a are formed on the insulating layers 12, 41, 42, 43, and 44. These components will now be described from the bottom in order. FIG. 4 shows the lower part, that is, from the first layer to the third layer. FIG. 5 shows the upper part, that is, from the fourth layer to the sixth layer.

The first layer includes scanning lines 11a composed of, for example, at least one high melting point metal selected from the group consisting of Ti, Cr, W, Ta, and Mo, an alloy thereof, an metal silicide thereof, a polysilicide thereof, a layered structure thereof, or conductive polysilicon. The scanning lines 11a are patterned along the X direction in FIG. 4 in plan view such that the scanning lines 1a have a strip shape. In more detail, each of the strip-shaped scanning lines 11a can include a main line part extending along the X direction in FIG. 4, and protrusion parts extending along the Y direction in FIG. 4 in which the data lines 6a and a capacitor wiring 400 are extended. The protrusion parts extending from adjacent scanning lines 11a are not connected with each other. Accordingly, the individual scanning lines 11a are separated.

The second layer can include TFTs 30 having gate electrodes 3a. As shown in FIG. 6, a TFT 30 has a lightly doped drain (LDD) structure. The TFT 30 includes a gate electrode 3a; a channel region 1a' of a semiconductor layer 1a, wherein a channel is formed by an electric field from the gate electrode 3a, and the channel region 1a' composed of, for example, polysilicon film; an insulating layer 2 including a gate insulating layer that insulates the gate electrode 3a and the semiconductor layer 1a, a lightly doped source region 1b, a lightly doped drain region 1c, a heavily doped source region 1d, and a heavily doped drain region 1e in the semiconductor layer 1a.

According to the first embodiment, the second layer includes relay electrodes 719 that are composed of the same film as the gate electrodes 3a. In plan view, as shown in FIG. 4, the relay electrodes 719 are formed like islands such that the relay electrodes 719 are substantially disposed at the center of a side extending in the X direction of each of the pixel electrodes 9a. The relay electrodes 719 and the gate electrodes 3a are formed as the same film. If the gate electrodes 3a are composed of, for example, a conductive polysilicon film, the relay electrodes 719 are also composed of, for example, the conductive polysilicon film.

Referring to FIG. 6, an insulating underlayer 12 composed of for example, silicon oxide is formed between the scanning lines 1a and the TFTs 30. The insulating underlayer 12 has a function for insulating the TFTs 30 from the scanning lines 11a. The insulating underlayer 12 is formed on the entire surface of the TFT array substrate 10. Therefore, the insulating underlayer 12 prevents the characteristics of the pixel-switching TFTs 30 from changing, due to the roughness of the TFT array substrate 10 caused by surface polishing or a residual contamination after washing.

Grooved contact holes 12cv are formed on the insulating underlayer 12. In plan view, the contact holes 12cv are formed at both sides of the semiconductor layer 1a and along the longitudinal direction of a channel of the semiconductor layer 1a that extends along data lines 6a to be described in greater detail below. The gate electrodes 3a formed on the contact holes 12cv have downward recesses that correspond to the contact holes 12cv. The gate electrodes 3a are formed such that the entire contact holes 12cv are filled. Accordingly, a sidewall 3b formed with the gate electrodes 3 is extended from the gate electrode 3a. Referring to FIG. 4, the semiconductor layer 1a of the TFT 30 is covered from the lateral side in plan view. This structure suppresses light incident from this part.

As shown in FIG. 4, the sidewall 3b is formed such that the contact hole 12cv is filled, and the bottom of the sidewall 3b is in contact with a scanning line 11a. As described above, the scanning line 11a has a strip shape. Therefore, the gate electrode 3a and the scanning line 11a, both of which are disposed in the same row, always have the same electrical potential in the row.

Referring to FIG. 6, a third layer formed on the second layer includes storage capacitors 70. A storage capacitor 70 includes a lower electrode 71, a capacitor electrode 300, and a dielectric film 75 disposed therebetween. The lower electrode 71 is a capacitor electrode at the pixel electrical potential, and is connected to a heavily doped drain region 1e of a TFT 30 and a pixel electrode 9a. The capacitor electrode 300 is a capacitor electrode at a fixed electrical potential. The storage capacitors 70 significantly improve the retention property of the electrical potential in the pixel electrodes 9a. As shown in plan view in FIG. 4, a storage capacitor 70 of the first embodiment is not formed in a light transmission area that roughly corresponds to an area having a pixel electrode 9a thereon. In other words, the storage capacitor 70 of the first embodiment is formed within a light shielding area. Therefore, the electro-optic device has a relatively large overall aperture ratio of the pixels, and can display images with superior brightness.

Instead of the lower electrode 71, the capacitor electrode at the pixel electrical potential may form the upper part of the storage capacitor 70. In this case, as a matter of course, the capacitor electrode 300, i.e., a capacitor electrode at a fixed electrical potential, forms the lower part of the storage capacitor 70. A preferable example is that the capacitor electrode at the pixel electrical potential may be composed of the same film as the heavily doped drain region 1e that is an extension of the heavily doped drain region 1e of the TFT 30. The capacitor electrode 300, i.e., the capacitor electrode at the fixed electrical potential, may be formed below the TFT 30, and may be composed of the same film as a light-shielding layer that shields light incident from the lower part to the TFT 30. In this case, capacitor wiring 400, to be described later, is preferably composed of the same film as the capacitor electrode 300, i.e., the capacitor electrode at the fixed electrical potential, because this structure is simple. The layered structure is not limited to the above structure.

In more detail, the lower electrode 71 is composed of; for example, a conductive polysilicon film and functions as a capacitor electrode at the pixel electrical potential. The lower electrode 71 may be a single film or a multilayer film that includes metals or alloys. In addition, the lower electrode 71 relays a pixel electrode 9a to a heavily doped drain region 1e of a TFT 30. This relay connection is performed through the relay electrode 719.

The capacitor electrode 300 functions as a capacitor electrode at the fixed electrical potential of the storage capacitor 70. According to the first embodiment, the capacitor electrode 300 is electrically connected to capacitor wiring 400 having a fixed electrical potential so that the capacitor electrode 300 also has the fixed electrical potential. Although the capacitor wiring 400 is used as a relay so that the capacitor electrode 300 has the fixed electrical potential, the capacitor wiring 400 may be composed of the same film as the capacitor electrode 300 and may be formed by extending the capacitor electrode 300. In this case, an additional film is not required to form the capacitor wiring 400. Consequently, this structure does not increase the wiring resistance due to a connection resistance, and simplifies the manufacturing process. The capacitor electrode 300 is composed of at least one high melting point metal selected from the group consisting of, for example, Ti, Cr, W, Ta, and Mo; an alloy thereof; a metal silicide thereof, a polysilicide thereof; or a layered structure thereof. The capacitor electrode 300 is preferably composed of tungsten silicide. The capacitor electrode 300 composed of the above material shields light incident from upper side to the TFT 30.

As shown in FIG. 6, the dielectric film 75 has a relatively small thickness of, for example, 5 to 200 nm. The dielectric film 75 is composed of, for example, a high temperature oxide (HTO) or a low temperature oxide (LTO), such as silicon oxide, or silicon nitride. In order to increase the capacitance of the storage capacitor 70, the thickness of the dielectric film 75 is preferably made as small as possible as long as the dielectric film 75 has a sufficient reliability.

Referring to FIG. 6, the dielectric film 75 of the first embodiment can include two films, i.e., a lower silicon oxide film 75a and an upper silicon nitride film 75b. The upper silicon nitride film 75b is patterned so that the dimensions of the silicon nitride film 75b are slightly larger than those of the lower electrode 71, i.e., the capacitor electrode at the pixel electrical potential. The silicon nitride film 75b is formed within the light shielding area (non-aperture area).

A first insulating interlayer 41 can be formed on the TFT 30, the gate electrodes 3a, and the relay electrode 719 and under the storage capacitor 70. The first insulating interlayer 41 is composed of a silicate glass, such as non-silicate glass (NSG), phosphorus silicate glass (PSG), boron silicate glass (BSG), and boron phosphorus silicate glass (BPSG), silicon nitride, or silicon oxide. The first insulating interlayer 41 is preferably composed of non-silicate glass (NSG).

A contact hole 81 is formed through the first insulating interlayer 41 and a second insulating interlayer 42. The heavily doped source region 1d of the TFT 30 is electrically connected to a data line 6a, to be described below, through the contact hole 81. A contact hole 83 that electrically connects the heavily doped drain region 1e of the TFT 30 with the lower electrode 71 of the storage capacitor 70 is formed through the first insulating interlayer 41. A contact hole 88 which electrically connects the lower electrode 71, i.e., the capacitor electrode at the pixel electrical potential, of the storage capacitor 70 with the relay electrode 719 is formed through the first insulating interlayer 41. Furthermore, a contact hole 882 is formed through the first insulating interlayer 41 and a second insulating interlayer 42 to be described below. The relay electrode 719 is electrically connected to a second relay electrode 6a2, to be described later, through the contact hole 882.

A fourth layer formed on the third layer includes data lines 6a. Referring to FIG. 6, a data line 6a includes three films, i.e., from the bottom, an aluminum film (see reference numeral 41A in FIG. 6), a titanium nitride film (see reference numeral 41TN in FIG. 6), and a silicon nitride film (see reference numeral 401 in FIG. 6). The silicon nitride film is patterned so that the aluminum film and the titanium nitride film formed thereunder are covered with the silicon nitride film having slightly larger dimension.

A capacitor wiring-relay layer 6a1 and a second relay electrode 6a2, both of which are composed of the same film as the data line 6a, are formed on the fourth layer. Referring to FIG. 5 in plan view, the planar shapes of the capacitor wiring-relay layer 6a1 and the second relay electrode 6a2 are not continuous with the data line 6a, but are separated from each other in the pattern. For example, in a data line 6a disposed at the left side in FIG. 5, a capacitor wiring-relay layer 6a1 having a substantially rectangular shape is disposed at the right side of the data line 6a, and in addition, a second relay electrode 6a2 having a substantially rectangular shape slightly larger than that of the capacitor wiring-relay layer 6a1 is disposed at the right side of the capacitor wiring-relay layer 6a1.

A second insulating interlayer 42 is formed between the storage capacitor 70 and the data line 6a. The second insulating interlayer 42 is composed of a silicate glass, such as NSG, PSG, BSG, and BPSG; silicon nitride; or silicon oxide. The second insulating interlayer 42 is preferably formed by plasma chemical vapor deposition with tetraethyl orthosilicate gas. As described above, the contact hole 81 is formed through the second insulating interlayer 42. The heavily doped source region 1d of the TFT 30 is electrically connected with a data line 6a through the contact hole 81. A contact hole 801 is formed through the second insulating interlayer 42. The contact hole 801 electronically connects the capacitor wiring-relay layer 6a1 with the capacitor electrode 300, which is an upper electrode of the storage capacitor 70. Furthermore, the contact hole 882 is formed through the second insulating interlayer 42. The contact hole 882 electrically connects the second relay electrode 6a2 with the relay electrode 719.

A fifth layer formed on the fourth layer includes capacitor wiring 400. Referring to FIG. 5 in plan view, the capacitor wiring 400 is formed in grid shape and extends in the X direction and in the Y direction in the figure. Each part of the capacitor wiring 400 extending in the Y direction is formed such that the capacitor wiring 400 particularly covers each of the data lines 6a. The capacitor wiring 400 has a width larger than that of the data lines 6a. Each part of the capacitor wiring 400 extending in the X direction has a cut portion around the center of one side of each of the pixel electrodes 9a in order to provide a space where a third relay electrode 402, to be described later, is formed.

Furthermore, referring to FIG. 5, roughly triangular areas are formed at the corners of intersections formed by each of the capacitor wiring 400 extending in the X direction and the Y direction such that the triangular areas fill the corners. These triangular areas of the capacitor wiring 400 can effectively shield light incident on the semiconductor layer 1a of the TFT 30. Light obliquely incident on the semiconductor layer 1a is reflected or absorbed at the triangular areas and does not reach the semiconductor layer 1a. Consequently, this structure suppresses the generation of photo leakage current, and provides high quality images without, for example, flickering.

The capacitor wiring 400 is extended from the image display area 10a including arranged pixel electrodes 9a and the surrounding part of the image display area 10a. The capacitor wiring 400 is electrically connected with the electrical potential of the counter electrode and a constant electrical potential source of a driving circuit or other peripheral circuits. Accordingly, the capacitor wiring 400 has a fixed electrical potential (see a later description relating to the wiring 404).

As described above, the capacitor wiring 400 covers the entirety of each data lines 6a and has a fixed electrical potential. Accordingly, the influence of capacitive coupling generated between the data lines 6a and pixel electrodes 9a can be removed. The change of electrical potential in the pixel electrodes 9a caused by the electrical connection to the data lines 6a can be prevented. Therefore, unevenness of the display, generated along the data lines 6a, can be suppressed in the image. In particular, according to the first embodiment, since the capacitor wiring 400 is formed in a grid shape, unnecessary capacitive coupling can be suppressed in areas formed by extending the scanning lines 11a.

Third relay electrodes 402 that are composed of the same film as the capacitor wiring 400 are formed on the fifth layer. Each of the third relay electrodes 402 relays the electrical connection between the second relay electrode 6a2 and the pixel electrode 9a through contact holes 804 and 89 to be described below. In plan view, the capacitor wiring 400 and the third relay electrodes 402 are formed not continuously but separately from each other in the pattern.

The capacitor wiring 400 and the third relay electrodes 402 include two films, i.e., a lower aluminum film and an upper titanium nitride film. The capacitor wiring 400 and the third relay electrodes 402 function as a light-shielding layer because aluminum has relatively superior light-reflection properties and titanium nitride has relatively superior light-absorption properties. This structure can block the light (see FIG. 6) incident on the semiconductor layer 1a of the TFT 30 at the upper side.

Figure 8:
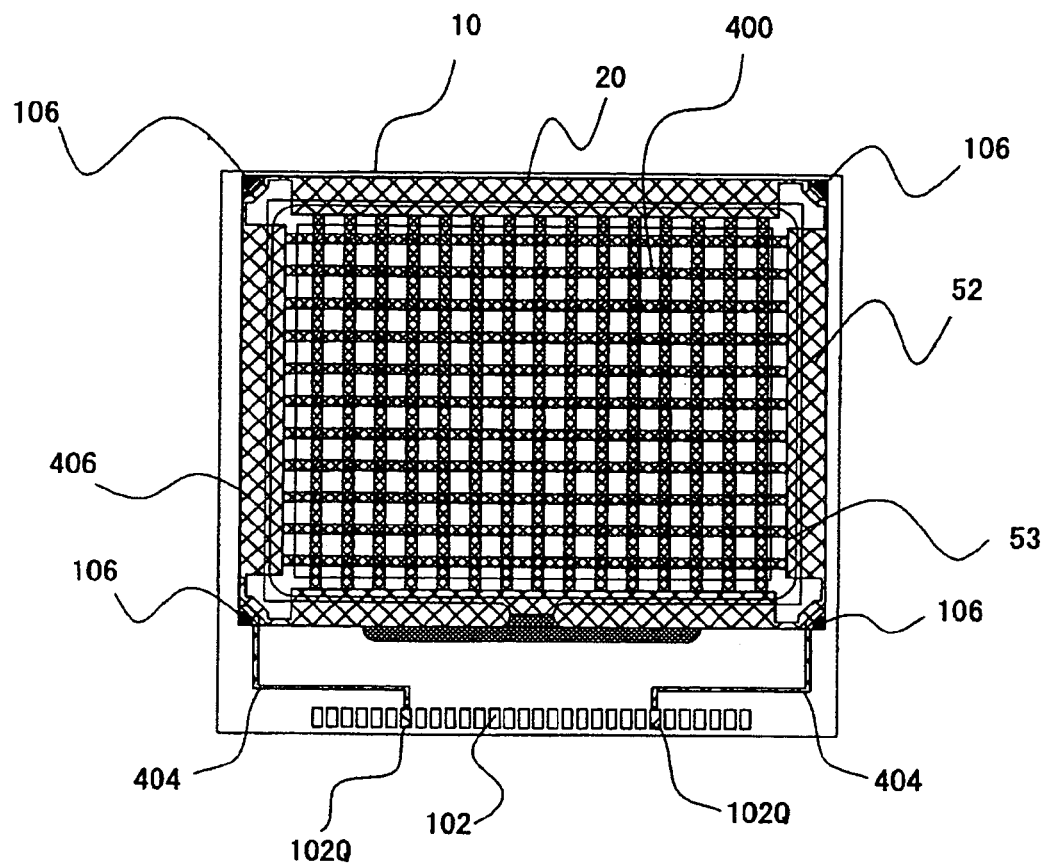
FIG. 8 is similar to FIG. 1, and clearly shows, for example, a frame and capacitor wiring to especially explain the arrangement.

According to the first embodiment, referring to FIGS. 7(a) and 7(b), layout wiring extended from the capacitor wiring 400 is formed at an area other than the image display area 10a. The layout wiring includes wiring 404 (an example of second wiring in the invention) and a frame (i.e., frame-shaped pattern) 406. The layout wiring will now be described with reference to the figures cited above and FIG. 8. FIG. 8 is similar to FIG. 1, and clearly shows the arrangement of the layout wiring, which includes the wiring 404 and the frame 406, and the capacitor wiring 400. In FIG. 8, for the purpose described above, for example, the reduction scale of the wiring 404, and the reduction scale, the planar shape, and the array pitch of the frame 406 are modified so that the components can be appropriately recognized. Some components shown in other figures (for example a data line-driving circuit 101 in FIG. 1 and third relay electrodes 402 in FIG. 5) are not shown in FIG. 8.

Referring to FIGS. 7(a) and 8, the wiring 404, which is extended from the capacitor wiring 400 through the frame 406, is formed in the peripheral area. The wiring 404 is formed as the same film as the capacitor wiring 400 and the third relay electrodes 402 (hereinafter may be referred to as capacitor wiring 400 etc.) on the third insulating interlayer 43. The wiring 404 includes two films, i.e., a lower aluminum film and an upper titanium nitride film, as in the capacitor wiring 400 and the third relay electrodes 402.

A part of the wiring 404 forms an external circuit-connecting terminal 102Q, which is a part of the external circuit-connecting terminals 102 described with reference to FIGS. 1 and 2. A contact hole 44H1 is formed through the fourth insulating interlayer 44 formed on the wiring 404. The contact hole 44H1 reaches the wiring 404, and the upper surface of the wiring 404 is exposed. Thus, the external circuit-connecting terminal 102Q is formed.

In the formation of the contact hole 44H1, the upper titanium nitride film of the wiring 404 may be removed. When the wiring 404 is electrically connected with an external circuit, the external circuit is directly connected with the lower aluminum film. In this case, the resistance at the connecting face can be decreased. If the upper titanium nitride film of the wiring 404 remains, inspection of the electro-optic device through the external circuit-connecting terminal 102Q is difficult to achieve. Unfortunately, a terminal that is used for inspection readily slips because the titanium nitride film is hard. The removal of the titanium nitride film prevents this disadvantage.

Although all the external circuit-connecting terminals 102 shown in FIG. 1 include the wiring 404 shown in FIG. 7(a), only a part of the wiring 404 is extended from the capacitor wiring 400. In other words, only a part of the wiring 404 is electrically connected with the capacitor wiring 400. As shown in FIGS. 8 and 1, a part of the wiring 404 connected to the specific external circuit-connecting terminals 102Q is extended from the capacitor wiring 400. On the other hand, although the other part of the wiring 404 corresponding to the rest of the external circuit-connecting terminals 102 is formed as the same film as the capacitor wiring 400 etc., the other part of the wiring 404 and the capacitor wiring 400 etc. are separately formed in the pattern.

According to the first embodiment, referring to FIGS. 7(b) and 8, a frame 406, which is extended from the capacitor wiring 400 etc. and the wiring 404, is formed. The frame 406 is formed as the same film as the capacitor wiring 400 etc. on the third insulating interlayer 43. The frame 406 includes two films, i.e., a lower aluminum film and an upper titanium nitride film, as in the capacitor wiring 400 etc.

Referring to FIG. 8, in plan view, the frame 406 is formed at the frame area that distinguishes the image display area 10a from the peripheral area (i.e., the area where the frame-shaped light-shielding film 53 is disposed) and an area where the sealing member 52 surrounding the frame area is formed. Alternatively, the frame 406 is formed around the entire periphery of the image display area 10a. The frame 406 has a rectangular shape as a whole. As shown in the lower part of FIG. 8, the frame 406 is extended from the wiring 404 connected to the specific external circuit-connecting terminals 102Q. That is, the frame 406 and the specific external circuit-connecting terminals 102Q are electrically connected with each other. The frame 406 is extended from the capacitor wiring 400. That is, the capacitor wiring 400 and the specific external circuit-connecting terminals 102Q are electrically connected with each other. Consequently, the wiring 404, the frame 406, and the capacitor wiring 400, all of which are connected with the specific external circuit-connecting terminals 102Q, always have the same electrical potential.

Referring to FIG. 7(b), a part of the frame 406 is exposed by the contact hole 44H2. The sealing member 52 including the conductive member 106 fills in the contact hole 44H2 to electrically connect the frame 406 with the counter electrode 21 (a portion on the frame 406 being in contact with the conductive member 106 is hereinafter referred to as connecting portion 406C). As described with reference to FIG. 1, since conductive members 106 are disposed at the four corners of the counter substrate 20, the connecting portion 406C are formed at the four corners.

According to the first embodiment, the wiring 404, the frame 406, the capacitor wiring 400, and the counter electrode 21, all of which are connected with the specific external circuit-connecting terminal 102Q, always have the same electrical potential.

In the formation of the contact hole 44H2, the upper titanium nitride film of the frame 406 may be removed. In this case, since the conductive member 106 is directly connected with the lower aluminum film of the frame 406, the resistance at the connecting face can be decreased. If the upper titanium nitride film remains, the conductive member 106 is not embedded because of the hardness of the titanium nitride film. Unfortunately, this structure decreases the connecting area and increases the resistance. The removal of the titanium nitride film prevents this disadvantage.

Referring to FIG. 7, a first level adjusting film 11aP is formed as the same film as the scanning line 11a formed in the image display area. A second level adjusting film 3aP is formed as the same film as the gate electrode 3a and the relay electrode 719. The first level adjusting film 11aP and the second level adjusting film 3aP adjust, for example, the entire vertical length in the layered structure of the image display area and the peripheral area.

Referring to FIG. 6, a third insulating interlayer 43 is formed between the data line 6a and the capacitor wiring 400. The third insulating interlayer 43 can be composed of a silicate glass, such as NSG, PSG, BSG, and BPSG; silicon nitride; or silicon oxide. The third insulating interlayer 43 is preferably formed by plasma chemical vapor deposition with tetraethyl orthosilicate gas. A contact hole 803 that electrically connects the capacitor wiring 400 with the capacitor wiring-relay layer 6a1 is formed through the third insulating interlayer 43. A contact hole 804 that electrically connects the third relay electrode 402 with the second relay electrode 6a2 is formed through the third insulating interlayer 43.

As described above, a sixth layer includes the pixel electrodes 9a formed in a matrix, and the alignment film 16 formed on the pixel electrodes 9a. A fourth insulating interlayer 44 is formed under the pixel electrodes 9a. The fourth insulating interlayer 44 is composed of a silicate glass, such as NSG, PSG, BSG, and BPSG; silicon nitride; or silicon oxide. The fourth insulating interlayer 44 is preferably composed of NSG. A contact hole 89 that electrically connects the pixel electrode 9a with the third relay electrode 402 is formed through the fourth insulating interlayer 44. The pixel electrodes 9a is electrically connected with the TFT 30 through the contact hole 89, the third relay electrode 402, the contact hole 804, the second relay electrode 6a2, the contact hole 882, the relay electrode 719, the contact hole 881, the lower electrode 71, and the contact hole 83.

According to the first embodiment, the surface of the fourth insulating interlayer 44 is planarized by, for example, chemical mechanical polishing (CMP). Accordingly, alignment defects of the liquid crystal layer 50 due to a difference in level between the various wiring lines and components disposed under the fourth insulating interlayer 44 can be prevented. Instead of or in addition to the planarizing process on the fourth insulating interlayer 44, a groove may be formed on at least one of the TFT array substrate 10, the insulation underlayer 12, the first insulating interlayer 41, the second insulating interlayer 42, and the third insulating interlayer 43, and then components such as wiring lines, e.g., the data lines 6a, and the TFTs 30 may be embedded in the groove to planarize the surface.

As described in the structure of the fifth layer, the electro-optic device of the first embodiment includes, in particular, the layout wiring having the wiring 404 and the frame 406. Accordingly, the electro-optic device has the following advantages.

First, according to the first embodiment, the frame 406 is formed at the frame area and the sealing area. As shown by arrow L1 in FIG. 7(b), light leakage can be prevented in the area where the frame 406 is formed. Therefore, an image of, for example, various wiring patterns is not generated at the periphery of the image. Thus, the electro-optic device of the first embodiment displays a high quality image.

In particular, according to the first embodiment, since the frame 406 surrounds the entire periphery of the image display area 10a, light transmitted to the frame area or the sealing area can be completely shielded. The frame 406 includes two films, i.e., the lower aluminum film and the upper titanium nitride film (both films are an example of the "light-shielding material" in the present invention). This frame 406 provides a reliable light-shielding effect. As shown in FIG. 8, since the frame 406 is not overlapped with the image display area 10a, the frame 406 does not interfere with the light that is transmitted through the image display area 10a. Therefore, the image can be displayed as desired. If the sealing member 52 is composed of, for example, a photo-curable resin, the light is preferably irradiated from the upper direction in FIG. 7(b), that is, from the direction adjacent to the counter substrate 20 in order to cure the resin.

In addition, according to the first embodiment, since the frame-shaped light-shielding film 53 is disposed on the counter substrate 20, the light shielding shown by arrow L2 in FIG. 7(b) can be achieved. Even if light is transmitted through the frame-shaped light-shielding film 53, the light is reflected or absorbed by the frame 406, i.e., the second light-shielding film. Thus, the first embodiment provides a double light-shielding effect.

Secondly, the frame 406 according to the first embodiment is electrically connected with the counter electrode 21 through the conductive member 106. The frame 406 is also electrically connected with the capacitor wiring 400. In addition to the light-shielding effect, the frame 406 has a function to supply the counter electrode 21, the capacitor wiring 400, and the capacitor electrode 300 with an electrical potential. (The electrical potential supply is performed through the contact holes 801 and 803, and the capacitor wiring-relay layer 6a1. See FIG. 6.) Consequently, the structure of the device can be simplified.

Referring to FIGS. 8 and 1, the conductive member 106 is disposed at the four corners of the image display area 10a. Preferably, the frame 406 is electrically connected with the counter electrode 21 through the conductive member 106; however the conductive member 106 does not disturb the image display. Furthermore, since the frame 406 surrounds the entire periphery of the image display area 10a, the frame 406 is electrically connected with the counter electrode 21 more reliably. The reason is as follows: The entire area of the frame 406 is electrically connected (in other words, the frame 406 is a continuous pattern). In addition, a plurality of the connecting portions 406C is formed at the four corners of the image display area 10a, i.e., the four corners of the frame 406. Even if a part of the frame 406, or some of the four conductive members 106, is not electrically connected for some reason, the electrical connection can be satisfactorily achieved by the other parts.

As described above, according to the first embodiment, the counter electrode 21 maintains a significantly stable electrical potential. Therefore, the alignment of the liquid crystal molecules in the liquid crystal layer 50, which is disposed between the counter electrode 21 and the pixel electrodes 9a, can be preferably adjusted. Thus, the electro-optic device of the first embodiment displays a high quality image.

According to the first embodiment, referring to FIG. 8, two external circuit-connecting terminals 102Q connected with the frame 406 are disposed at both the right and the left sides in the figure. The arrangement of the external circuit-connecting terminals 102Q of the present invention is not limited. For example, an external circuit-connecting terminal 102Q connected with the frame 406 may be disposed at only one side, either the left or the right, in the figure.

According to the first embodiment, as described above, the frame 406 that supplies the counter electrode 21 and the capacitor wiring 400 with an electrical potential is formed as a part of the wiring 404. That is, the frame 406 is formed as the same film as the wiring 404 connected with the specific external circuit-connecting terminals 102Q, and is electrically connected with the wiring 404. This structure can decrease the electrical resistance between the above components compared with a structure in which, for example, the components are individually formed on separated films and are electrically connected through contact holes. Consequently, this structure supplies the counter electrode 21 with a stable electrical potential, and in addition, prevents the generation of crosstalk due to the high resistance of, for example, the capacitor wiring 400.

In the first embodiment, the third insulating interlayer 43 is formed on the data line 6a. The wiring 404 and the capacitor wiring 400 are formed on the third insulating interlayer 43. According to the first embodiment, the following requirements can be achieved relatively easily (see FIG. 7(a)). The wiring 404 and the capacitor wiring 400 are formed as the same film; the external circuit-connecting terminals 102 must be externally exposed; and the wiring 404 must be electrically connected with the external circuit-connecting terminals 102. In particular, the wiring 404 and the capacitor wiring 400 are formed directly under the sixth layer having the pixel electrodes 9a. That is, the wiring 404 and the capacitor wiring 400 are formed under the pixel electrodes 9a with only the fourth insulating interlayer 44 formed therebetween. Therefore, the advantages described above are performed more effectively.

In this structure, as shown in FIG. 7(a), the contact hole 44H1 in which the external circuit-connecting terminal 102 is formed is formed only through the fourth insulating interlayer 44. As a result, the contact hole 44H1 has a relatively small depth, and can be readily formed.

Figure 9:
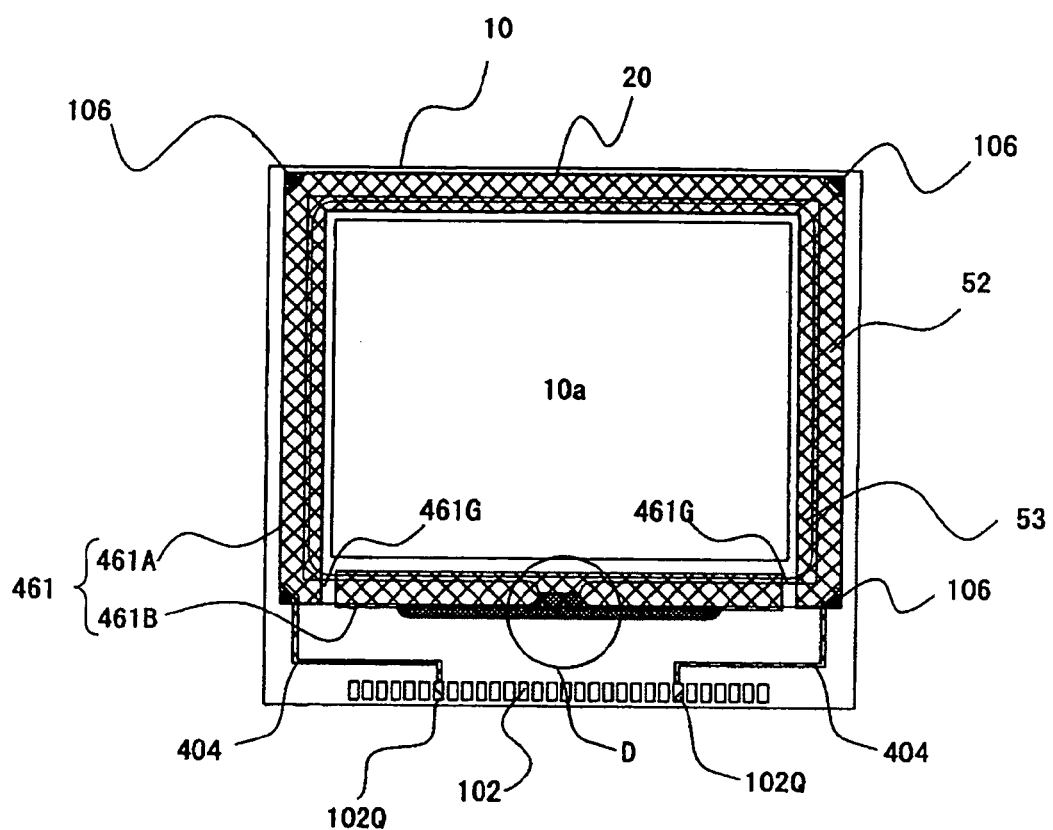
FIG. 9 is similar to FIG. 8, and shows a frame in an electro-optic device according to a second embodiment of the invention.
Figure 10:
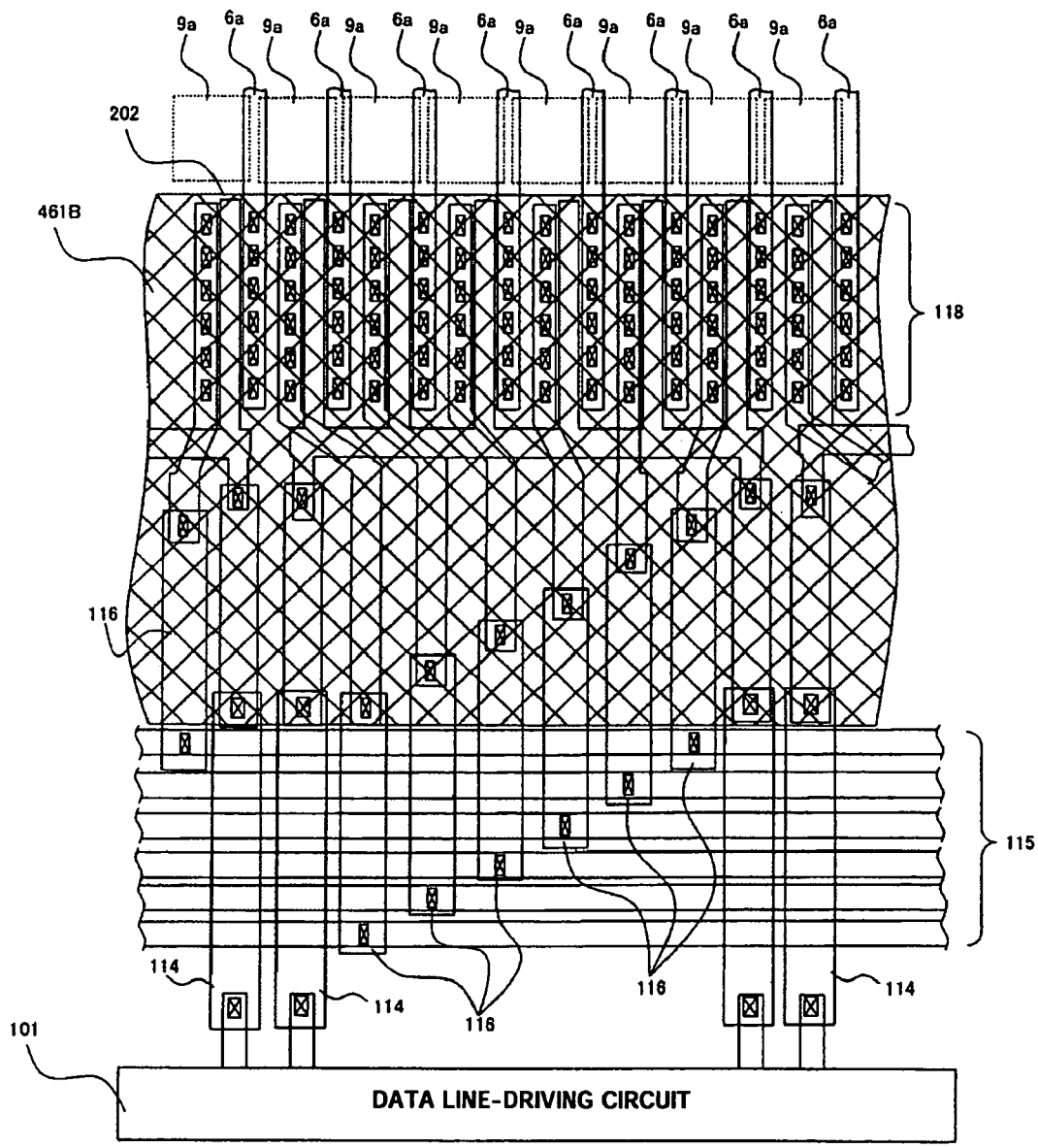
FIG. 10 is an explanatory enlarged view showing the vicinity of an area represented by symbol D in FIG. 9 and also showing, for example, the circuit structure in the relevant part.
Figure 11:
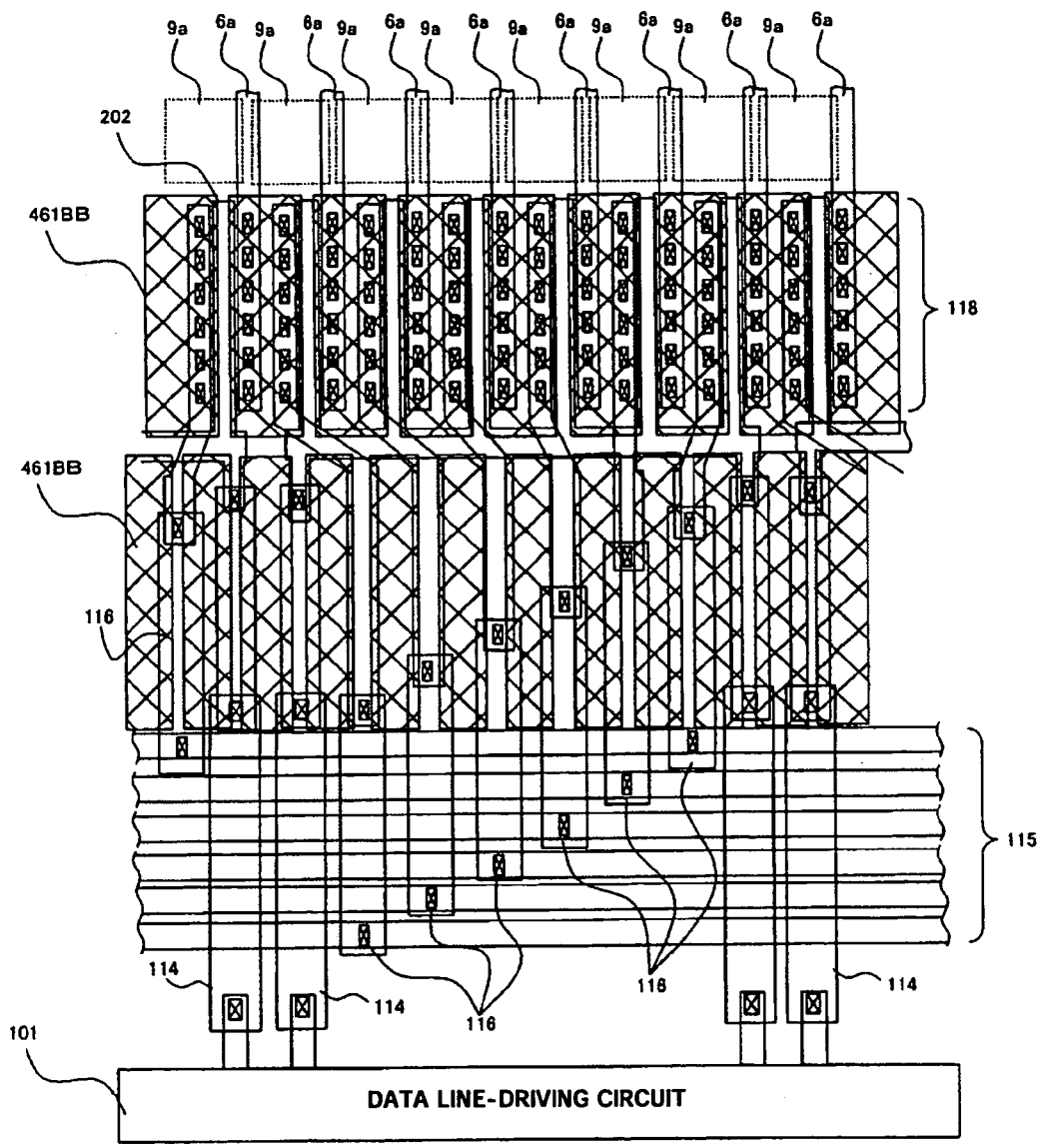
FIG. 11 is similar to FIG. 10, and shows a different frame.

The second embodiment of the invention will now be described with reference to FIGS. 9 to 11. FIG. 9 is similar to FIG. 8, and shows an electro-optic device having a different frame. Unlike FIG. 8, FIG. 9 does not show the capacitor wiring 400. FIGS. 10 and 11 are explanatory enlarged views showing the vicinity of an area represented by symbol D in FIG. 9 and showing, for example, the circuit structure in the relevant part. The electro-optic device of the second embodiment has almost the same structure, for example, the overall structure and the pixel structure, as in the first embodiment. The common parts will not be described, and the features of the second embodiment will now be mainly described.

Referring to FIG. 9, a frame 461 includes a first frame 461A and a second frame 461B. The first frame 461A corresponds to an example of first pattern in the present invention. As shown in FIG. 9, the first frame 461A is disposed along three continuous sides (the upper side, the left side, and the right side in the figure) of a rectangular image display area 10a. The second frame 461B corresponds to an example of second pattern in the invention. The second frame 461B is disposed along the remaining side (the lower side in the figure) of the image display area 10a, and is disposed separately from the first frame 461A (see the reference numeral 461G in the figure). Conductive members 106 are disposed on the first frame 461A.

According to the second embodiment, the first frame 461A and the four conductive members 106 formed thereon form a sufficiently large connecting area. Consequently, the frame 461 is electrically connected with the counter electrode 21 reliably, as in the first embodiment. Thus, the counter electrode 21 can maintain a significantly stable electrical potential. The first frame 461A and the second frame 461B provide the light-shielding effect, as in the first embodiment.

In particular, according to the second embodiment, the second frame 461B provides an advantage in that the second frame 461B is formed on an area corresponding to the data line-driving circuit 101 (not shown in FIG. 9, see FIG. 1).

FIG. 10 shows the vicinity of the data line-driving circuit 101. Control lines 114 extending from the data line-driving circuit 101 are connected with gates of switching elements 202 in a sampling circuit 118. The sources of the switching elements 202 are connected with image signal lines 115 through extending lines 116. The drains of the switching elements 202 are connected with data lines 6a. The data line-driving circuit 101 controls the on and off state of the switching elements 202, thereby controlling the supply of image signals from the image signal lines 115 to the data lines 6a.

Unfortunately, according to the above structure having the data line-driving circuit 101 and the periphery, capacitive coupling may be generated between the extending lines 116 and the counter electrode 21 disposed on the counter substrate 20. When capacitive coupling occurs, the electrical connection to one component unintentionally changes the electrical potential at the other component. Therefore, unfortunately, it is difficult to display the desired images.

According to the second embodiment, the second frame 461B is disposed at this area as shown in FIG. 10. In other words, the second frame 461B is disposed between the image signal lines 115 and the counter electrode 21. The second frame 461B prevents the generation of capacitive coupling. The electro-optic device of the second embodiment can preferably display desired images. In order to achieve this advantage more effectively, the second frame 461B preferably maintains a fixed electrical potential. For this purpose, the second frame 461B is preferably connected with capacitor wiring 400 (not shown in FIG. 9, see FIG. 8).

This advantage is also provided in an embodiment where the frame 406 surrounds the entire periphery of the image display area 10a, as in the first embodiment.

According to the second embodiment, the second frame 461B covers almost all parts of the sampling circuit 118 and the extending lines 116 extending from the sampling circuit 118. According to the invention, the arrangement of the second frame 461B is not limited to the above. For example, as shown in FIG. 11, strip-shaped second frames 461BB may be separately formed. In this case, unlike the case in FIG. 10, the strip-shaped second frames 461BB need not maintain a fixed electrical potential. Instead, the second frames 461BB may maintain a floating potential.

Figure 12:
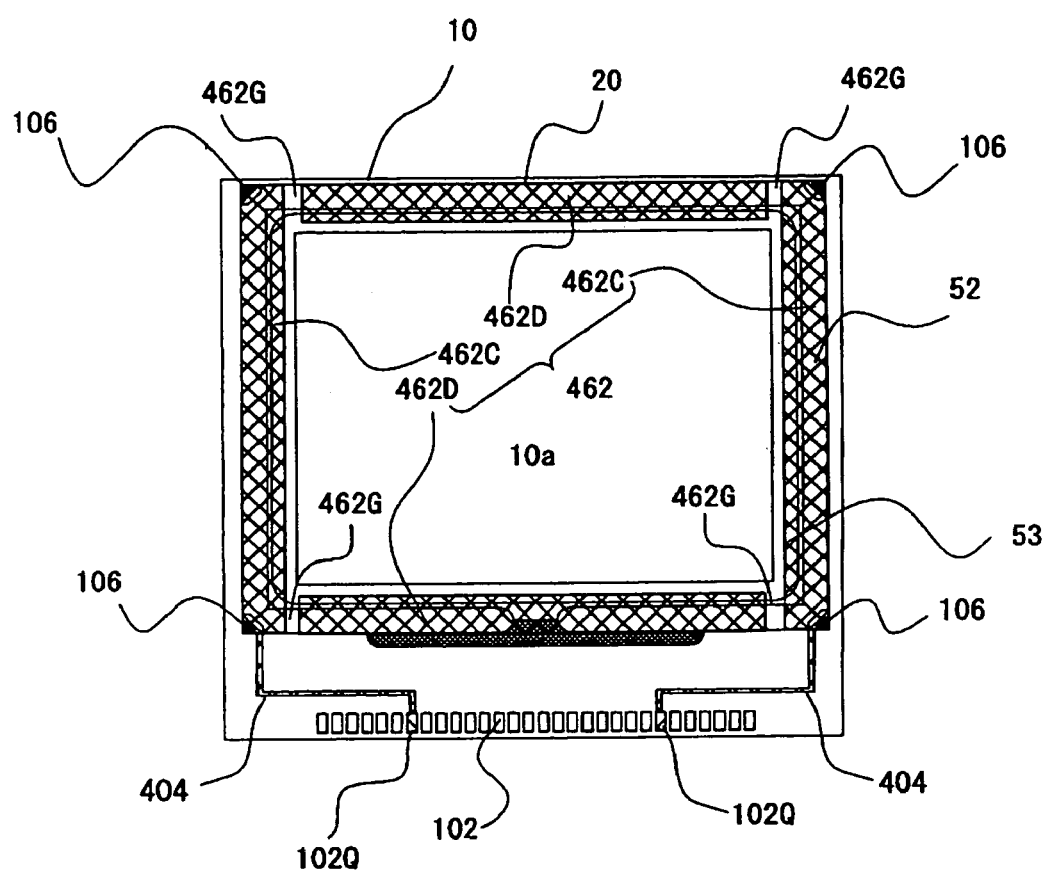
FIG. 12 is similar to FIG. 8, and shows a frame in an electro-optic device according to a third embodiment of the invention.

The third embodiment of the present invention will now be described with reference to FIG. 12. FIG. 12 is similar to FIG. 8, and shows an electro-optic device having a different frame. Unlike FIG. 8, FIG. 12 does not show the capacitor wiring 400. The electro-optic device of the third embodiment has almost the same structure, for example, the overall structure and the pixel structure, as in the first embodiment. The common parts will not be described, and the features of the third embodiment will now be mainly described.

Referring to FIG. 12, a frame 462 includes third frames 462C and fourth frames 462D. The third frames 462C correspond to an example of third pattern in the present invention. As shown in FIG. 12, the third frames 462C are disposed along two opposing sides (the left side and the right side in the figure) of a rectangular image display area 10a. The fourth frames 462D correspond to an example of "fourth pattern" in the present invention. The fourth frames 462D are disposed along the remaining two sides (the upper side and the lower side in the figure) of the image display area 10a, and are disposed separately from the third frames 462C (see the reference numeral 462G in the figure). Conductive members 106 are disposed on the third frames 462C.

Referring to FIG. 12, the third frames 462C are two linear patterns disposed along the left side and the right side of the image display area 10a. Each of the third frames 462C includes two conductive members 106. The third frames 462C and the conductive members 106 form a sufficiently large connecting area, as in the first embodiment. Therefore, the frame 462 is electrically connected with the counter electrode 21 reliably.

The fourth frames 462D prevent the generation of capacitive coupling between the extending lines 116 and the counter electrode 21, as in the second frame 461B in the second embodiment.

The third frames 462C and the fourth frames 462D also provide the light-shielding effect, as in the first embodiment.

Figure 13:
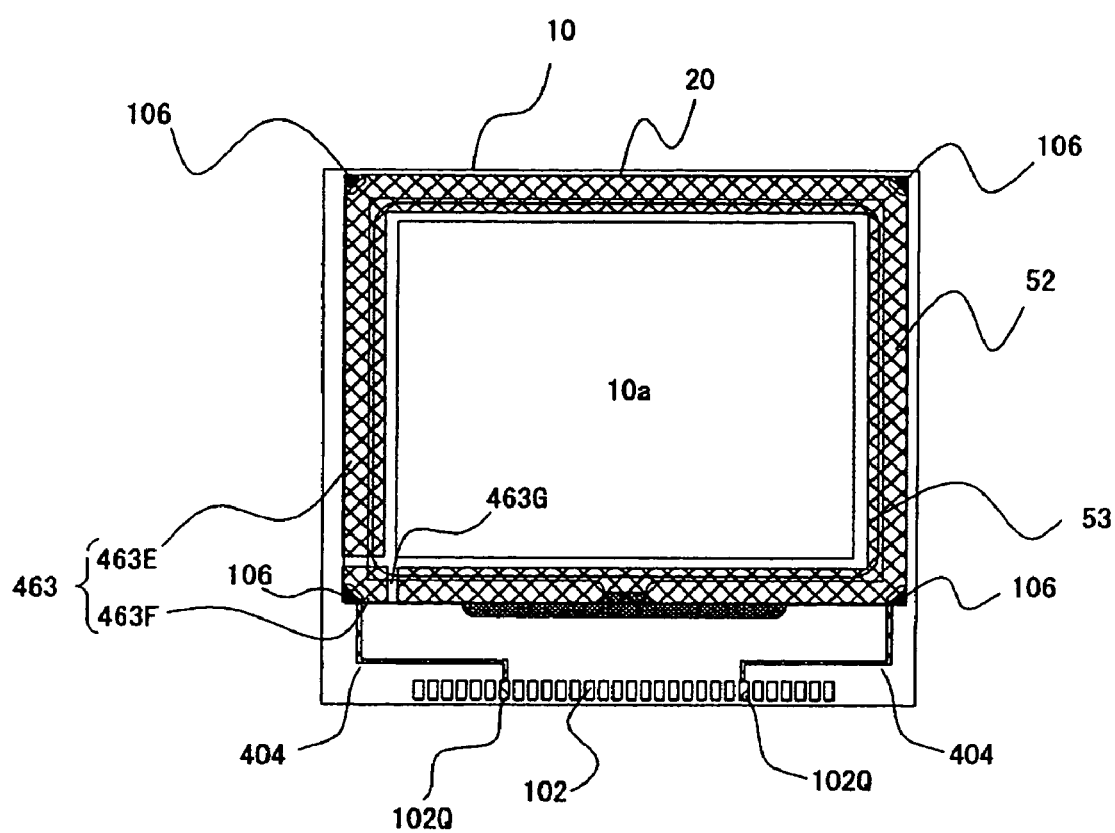
FIG. 13 is similar to FIG. 8, and shows a frame in an electro-optic device according to a fourth embodiment of the invention.

The fourth embodiment of the invention will now be described with reference to FIG. 13. FIG. 13 is similar to FIG. 8, and shows an electro-optic device having a different frame. Unlike FIG. 8, FIG. 13 does not show the capacitor wiring 400. The electro-optic device of the fourth embodiment has almost the same structure, for example, the overall structure and the pixel structure, as in the first embodiment. The common parts will not be described, and the features of the fourth embodiment will now be mainly described.

Referring to FIG. 13, a frame 463 includes a fifth frame 463E and a sixth frame 463F. The fifth frame 463E corresponds to an example of fifth pattern in the invention. As shown in FIG. 13, the fifth frame 463E is disposed along a rectangular image display area 10a except for a corner of the rectangle. The sixth frame 463F corresponds to an example of sixth pattern in the invention. The sixth frame 463F is disposed at the corner, and is disposed separately from the fifth frames 463E (see the reference numeral 463G in the figure). Conductive members 106 are disposed both on the fifth frame 463E and the sixth frame 463F.

According to the fourth embodiment, the following advantages can be obviously achieved, as in the first embodiment to the third embodiment. The frame 463 is electrically connected with the counter electrode 21 reliably. The generation of capacitive coupling between the extending lines 116 and the counter electrode 21 is prevented. Furthermore, light leakage can be prevented.

Figure 14:
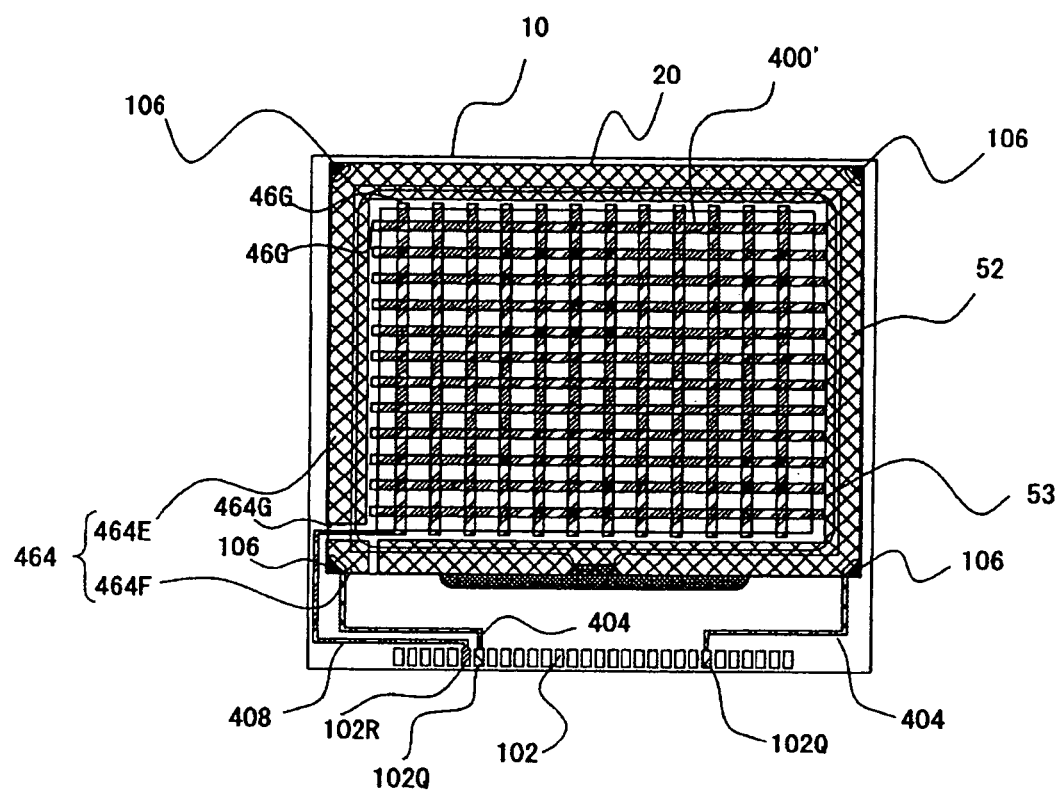
FIG. 14 is similar to FIG. 8, and shows a frame in an electro-optic device according to a fifth embodiment of the invention.

The fifth embodiment of the invention will now be described with reference to FIG. 14. FIG. 14 is similar to FIG. 8, and shows an electro-optic device having a different frame and so on. The electro-optic device of the fifth embodiment has almost the same structure, for example, the overall structure and the pixel structure, as in the first embodiment. The common parts will not be described, and the features of the fifth embodiment will now be mainly described.

Referring to FIG. 14, a frame 464 having a pattern substantially similar to the fourth embodiment is disposed. The frame 464 includes a fifth frame 464E formed around a rectangular image display area 10a except for a corner of the rectangle and a sixth frame 464F disposed at the corner. As in the fourth embodiment, three conductive members 106 are disposed on the fifth frame 464E, and a conductive member 106 is disposed on the sixth frame 464F. As in the fourth embodiment, wiring 404 for supplying an electrical potential to the conductive members 106 is disposed on a substrate. As in the fourth embodiment, a part of the wiring 404 is connected with specific external circuit-connecting terminals 102Q. In particular, however, the wiring 404 according to the fifth embodiment corresponds to an example of first portion of a second wiring in the invention, and the specific external circuit-connecting terminals 102Q corresponds to an example of first portion of external circuit-connecting terminals in the present invention.

According to the fifth embodiment, the fifth frame 464E and the sixth frame 464F are not electrically connected with capacitor wiring. Although the frame 464 and capacitor wiring 400' are formed as the same film, the frame 464 is disposed separately from the capacitor wiring 400' in the pattern (see the reference numeral 46G in the figure). Wiring 408 is extended to the capacitor wiring 400' to which an electrical potential is not supplied from the frame 464. The wiring 408 corresponds to an example of second portion of the second wiring in the invention. The wiring 408 is disposed through a gap 464G disposed between the fifth frame 464E and sixth frame 464F, and is connected with a specific external circuit-connecting terminal 102R, which corresponds to an example of second portion of external circuit-connecting terminals in the invention.

As described above, in the fifth embodiment, the wiring 404, the frame 464, the wiring 408, and the capacitor wiring 400' are formed as the same film. (Of course, the film further includes a third relay electrode 402.) The wiring 404 is electrically connected with the frame 464 (this connected group is referred to as a first group). The wiring 408 is electrically connected with the capacitor wiring 400' (this connected group is referred to as a second group). On the other hand, the first group is not electrically connected with the second group.

According to this embodiment, the counter electrode 21, the capacitor wiring 400', and capacitor electrodes 300 individually can have different electrical potential. The counter electrode 21 is connected with the frame 464, the wiring 404, and the specific external circuit-connecting terminals 102Q through the conductive members 106. Accordingly, supplying the external circuit-connecting terminals 102Q with an electrical potential for the counter electrode 21 allows the electrical potential to be held at the counter electrode 21. On the other hand, the capacitor wiring 400' and capacitor electrodes 300 (see FIG. 6) that is electrically connected with the capacitor wiring 400' are electrically connected with the wiring 408 and the specific external circuit-connecting terminal 102R. Accordingly, supplying the external circuit-connecting terminal 102R with an electrical potential, which is different from that for the counter electrode 21, for the capacitor electrodes 300 allows the electrical potential to be held at the capacitor electrodes 300. According to the fifth embodiment, various electrical effects generated in the electro-optic device can be adequately adjusted because the counter electrode 21 and the capacitor electrodes 300 have different electrical potential.

According to the fifth embodiment, the following advantages can be achieved, as in the first embodiment to the fourth embodiment. The frame 464 is electrically connected with the counter electrode 21 reliably. The generation of capacitive coupling between the image signal lines 115 and the counter electrode 21 is prevented. Furthermore, light leakage can be prevented.

In the second, the third, and the fourth embodiments, each of the frames 461, 462, and 463 is electrically connected with the conductive members 106, the counter electrode 21, and the capacitor wiring 400. Therefore, an electrical potential that is common to the counter electrode 21, the capacitor wiring 400, and the capacitor electrodes 300 must be supplied to the specific external circuit-connecting terminals 102Q.

It should be understood that the invention is not limited to the above embodiments. In the second, the third, and the fourth embodiments, an electrical potential of the capacitor wiring 400 and the capacitor electrodes 300 may be supplied separately from another electrical potential of the counter electrode 21, as in the fifth embodiment, by using gaps 461G, 462G, and 463G in the frames 461, 462, and 463, respectively.

In the first embodiment to the fifth embodiment, an electrical potential supplied to the specific external circuit-connecting terminals 102Q or the specific external circuit-connecting terminal 102R may be used as a constant potential at a low voltage, the constant potential being supplied to a scanning line-driving circuits 104. In this case, the counter electrode 21 and the capacitor electrodes 300 have the same electrical potential as the constant potential. Alternatively, the electrical potential supplied to the specific external circuit-connecting terminals 102Q or the specific external circuit-connecting terminal 102R may be used as a constant potential being supplied to a data line-driving circuit 101.

Figure 15:
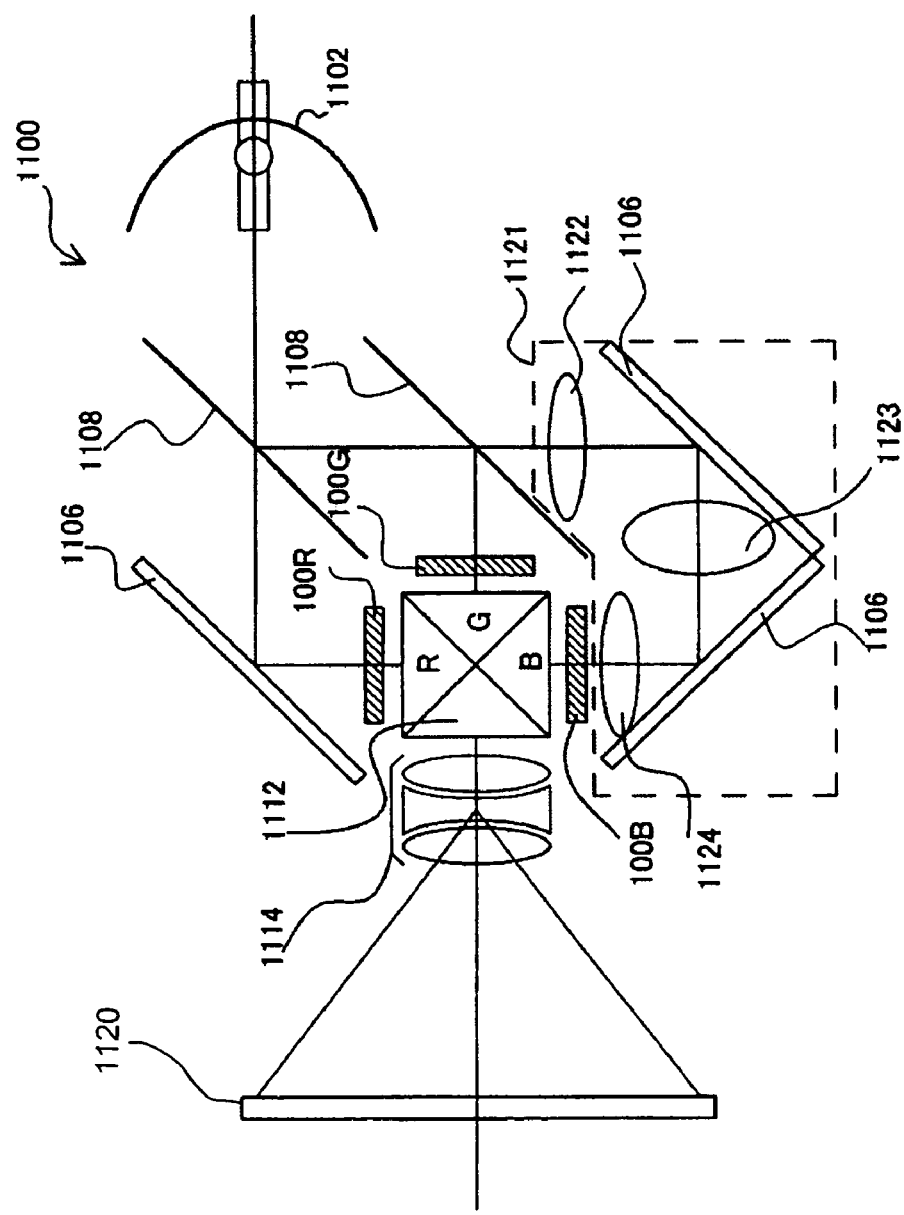
FIG. 15 is a schematic sectional view of a projection liquid crystal device according to each of the embodiments of the invention.

An embodiment of a projection color display will now be described. The projection color display is an example of electronic equipment in which the electro-optic device described above in detail is used as a light valve. The overall structure, in particular, the optical structure of the projection color display will now be described. FIG. 15 is a schematic sectional view of the projection color display.

Referring to FIG. 15, a liquid crystal projector 1100 is an example of the projection color display according to the present embodiment. The liquid crystal projector 1100 includes three liquid crystal modules used as light valves 100R, 100G, and 100B. The light valves 100R, 100G, and 100B are used for red light, green light, and blue light, respectively. Each of the liquid crystal modules includes a liquid crystal device in which a driving circuit is installed on a TFT array substrate. A lamp unit 1102, which is a source of white light such as a metal halide lamp, irradiates light. The incident light is divided into a red (R) light component, a green (G) light component, and a blue (B) light component, which correspond to three primary colors, by three mirrors 1106 and two dichroic mirrors 1108. Each of the light components is incident on corresponding light valves 100R, 100G, and 100B. In order to prevent optical loss due to a long optical path, the blue light component is particularly incident through a relay lens system 1121 having an incident lens 1122, a relay lens 1123, and an exit lens 1124. The light components corresponding to the three primary colors, which are modulated by the light valves 100R, 100G, and 100B, are combined again by a dichroic prism 1112. Then, the light is projected as a color image on a screen 1120 through a projection lens 1114.

The invention is not limited to the embodiments described above. The invention can be modified without departing from the scope and the spirit of the invention described in the claims and in the specification. The technical scope of the invention also includes these modified electro-optic devices and electronic equipment.

Additionally, while this invention has been described in conjunction with the specific embodiments thereof, it is evident that many alternatives, modifications and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. An electro-optic device, comprising:

a substrate;

data lines extending in one direction above the substrate;

scanning lines extending in a direction orthogonal to the data lines above the substrate;

switching elements to which scanning signals are supplied from the scanning lines, the switching elements being disposed above the substrate;

pixel electrodes to which image signals are supplied from the data lines through the switching elements, the pixel electrodes being disposed above the substrate, the substrate having an image display area including the pixel electrodes and the switching elements, and a peripheral area at a periphery of an image display area;

storage capacitors that hold an electrical potential at the pixel electrodes for a predetermined time, the storage capacitors being disposed above the image display area;

first wiring that supplies capacitor electrodes of the storage capacitors with a predetermined electrical potential, the first wiring being disposed above the image display area; and a frame formed as the same film as the first wiring, the frame being disposed at least a part of a frame area between the image display area and the peripheral area, the frame having at least one of separated segments having a floating potential.

2. The electro-optic device according to claim 1, the first wiring being formed of the same film as the capacitor electrodes to which the predetermined electrical potential is supplied, the first wiring being continuous with the capacitor electrodes in a same plane.

3. The electro-optic device according to claim 1, further comprising:
a counter substrate opposing the substrate; and
a sealing member that bonds the substrate with the counter substrate;
the frame being disposed at least a part of a sealing area where the sealing member is disposed.

4. The electro-optic device according to claim 1, further comprising:
a counter substrate opposing the substrate; and
a counter electrode disposed above the counter substrate;
the frame including a connecting portion electrically coupled with the counter electrode.

5. The electro-optic device according to claim 1, the frame being formed so as to be electrically coupled with the first wiring.

6. The electro-optic device according to claim 4, the connecting portion being disposed at a corner of the counter substrate.

7. The electro-optic device according to claim 1, the first wiring comprising a light-shielding material.

8. The electro-optic device according to claim 1, the first wiring having a layered structure comprising different materials.

9. The electro-optic device according to claim 1, further comprising:
a counter substrate opposing the substrate; and
a light-shielding film above the counter substrate, the frame being disposed so that the frame is overlapped by the light-shielding film.

10. The electro-optic device according to claim 9, the light-shielding film comprising a frame-shaped light-shielding film disposed along an edge of the counter substrate.

11. Electronic equipment, comprising the electro-optic device according to claim 1.

12. An electro-optic device, comprising:
a substrate;
data lines extending in one direction above the substrate;
scanning lines extending in a direction orthogonal to the data lines above the substrate;
switching elements to which scanning signals are supplied from the scanning lines, the switching elements being disposed above the substrate;
pixel electrodes to which image signals are supplied from the data lines through the switching elements, the pixel electrodes being disposed above the substrate, the substrate having an image display area including the pixel electrodes and the switching elements, and a peripheral area at a periphery of an image display area;
storage capacitors that hold an electrical potential at the pixel electrodes for a predetermined time, the storage capacitors being disposed above the image display area;
first wiring that supplies capacitor electrodes of the storage capacitors with a predetermined electrical potential, the first wiring being disposed above the image display area; and
a frame formed as the same film as the first wiring, the frame being disposed at least a part of a frame area between the image display area and the peripheral area, the frame covering at least a sampling circuit that supplies the data lines with the image signals.

13. An electro-optic device, comprising:
a substrate;
data lines extending in one direction above the substrate;
scanning lines extending in a direction orthogonal to the data lines above the substrate;
switching elements to which scanning signals are supplied from the scanning lines, the switching elements being disposed above the substrate;
pixel electrodes to which image signals are supplied from the data lines through the switching elements, the pixel electrodes being disposed above the substrate, the substrate having an image display area including the pixel electrodes and the switching elements, and a peripheral area at a periphery of an image display area;
storage capacitors that hold an electrical potential at the pixel electrodes for a predetermined time, the storage capacitors being disposed above the image display area;
first wiring that supplies capacitor electrodes of the storage capacitors with a predetermined electrical potential, the first wiring being disposed above the image display area;
a frame formed as the same film as the first wiring, the frame being disposed at least a part of a frame area between the image display area and the peripheral area;
a counter substrate opposing the substrate; and
a counter electrode disposed above the counter substrate;
the frame including a connecting portion electrically coupled with the counter electrode;
the image display area having a generally rectangular shape in plan view,
the frame having a first pattern along three continuous sides of the rectangle and a second pattern along a remaining side of the rectangle and separate from the first pattern, and
the connecting portion being disposed on the first pattern.

14. An electro-optic device, comprising: a substrate; data lines extending in one direction above the substrate; scanning lines extending in a direction orthogonal to the data lines above the substrate; switching elements to which scanning signals are supplied from the scanning lines, the switching elements being disposed above the substrate; pixel electrodes to which image signals are supplied from the data lines through the switching elements, the pixel electrodes being disposed above the substrate, the substrate having an image display area including the pixel electrodes and the switching elements, and a peripheral area at a periphery of an image display area; storage capacitors that hold an electrical potential at the pixel electrodes for a predetermined time, the storage capacitors being disposed above the image display area; first wiring that supplies capacitor electrodes of the storage capacitors with a predetermined electrical potential, the first wiring being disposed above the image display area; a frame formed as the same film as the first wiring, the frame being disposed at least a part of a frame area between the image display area and the peripheral area; a counter substrate opposing the substrate; a counter electrode disposed above the counter substrate; the frame including a connecting portion electrically coupled with the counter electrode; the image display area having a generally rectangular shape in plan view, the frame having a first pattern along two opposing sides of the rectangle and a second pattern along a remaining two sides of the rectangle and separate from the first pattern, the connecting portion being disposed on the first pattern.

15. An electro-optic device, comprising: a substrate; data lines extending in one direction above the substrate; scanning lines extending in a direction orthogonal to the data lines above the substrate; which scanning switching elements to signals are supplied from the scanning lines, the switching elements being disposed above the substrate; pixel electrodes to which image signals are supplied from the data lines through the switching elements, the pixel electrodes being disposed above the substrate, the substrate having an image display area including the pixel electrodes and the switching elements, and a peripheral area at a periphery of an image display area; storage capacitors that hold an electrical potential at the pixel electrodes for a predetermined time, the storage capacitors being disposed above the image display area; first wiring that supplies capacitor electrodes of the storage capacitors with a predetermined electrical potential, the first wiring being disposed above the image display area; and a frame formed as the same film as the first wiring, the frame being disposed at least a part of a frame area between the image display area and the peripheral area; a counter substrate opposing the substrate; a counter electrode disposed above the counter substrate; the frame including a connecting portion electrically coupled with the counter electrode; the image display area having a generally rectangular shape in plan view, the frame having a first pattern continuously formed around the rectangle except for a corner of the rectangle and a second pattern disposed at the corner and separate from the first pattern, and the connecting portion being disposed on at least one of the first pattern and the second pattern.

16. An electro-optic device, comprising:
a substrate;
data lines extending in one direction above the substrate;
scanning lines extending in a direction orthogonal to the data lines above the substrate;
switching elements to which scanning signals are supplied from the scanning lines, the switching elements being disposed above the substrate;
pixel electrodes to which image signals are supplied from the data lines through the switching elements, the pixel electrodes being disposed above the substrate, the substrate having an image display area including the pixel electrodes and the switching elements, and a peripheral area at a periphery of an image display area;
storage capacitors that hold an electrical potential at the pixel electrodes for a predetermined time, the storage capacitors being disposed above the image display area;
first wiring that supplies capacitor electrodes of the storage capacitors with a predetermined electrical potential, the first wiring being disposed above the image display area; and
a frame formed as the same film as the first wiring, the frame being disposed at least a part of a frame area between the image display area and the peripheral area;
external circuit-connecting terminals disposed along an edge of the substrate, the external circuit-connecting terminals being disposed above the peripheral area; and
second wiring continuous with the external circuit-connecting terminals, the second wiring being disposed above the peripheral area;
at least a part of the second wiring being formed of the same film as the first wiring and being formed so as to be electrically coupled with the first wiring.

17. The electro-optic device according to claim 16, the first wiring being disposed above the data lines with an insulating interlayer disposed therebetween.

18. The electro-optic device according to claim 16, the first wiring being disposed directly under a layer having the pixel electrodes.

19. The electro-optic device according to claim 16,
the first wiring not being electrically coupled with the frame,
a first portion of the second wiring being electrically coupled with the first wiring,
a second portion of the second wiring being electrically coupled with the frame,
the first portion being connected with a first portion of the external circuit-connecting terminals, and
the second portion being connected with a second portion of the external circuit-connecting terminals.

* * * * *